(12) United States Patent　　(10) Patent No.:　　US 9,043,622 B2
Isozaki et al.　　(45) Date of Patent:　　May 26, 2015

(54) ENERGY MANAGEMENT DEVICE AND POWER MANAGEMENT SYSTEM

(75) Inventors: Hiroshi Isozaki, Kanagawa-ken (JP); Jun Kanai, Tokyo (JP); Satoshi Ito, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 294 days.

(21) Appl. No.: 13/564,228

(22) Filed: Aug. 1, 2012

(65) Prior Publication Data

US 2013/0042124 A1　　Feb. 14, 2013

(30) Foreign Application Priority Data

Aug. 12, 2011　(JP) .................................. 2011-176935

(51) Int. Cl.
*G06F 1/00*　　(2006.01)
*H04L 29/06*　　(2006.01)
(Continued)

(52) U.S. Cl.
CPC .............. *H04L 63/20* (2013.01); *G06F 1/3203* (2013.01); *G06Q 10/04* (2013.01); *G06Q 50/06* (2013.01); *G06F 21/6218* (2013.01); *G06F 21/6272* (2013.01); *G06F 21/81* (2013.01); *G06F 21/85* (2013.01); *G06F 2221/2129* (2013.01); *G06F 2221/2141* (2013.01)

(58) Field of Classification Search
CPC ..... G06F 15/173; G06F 1/3203; G06F 21/20; G06F 9/00; G06F 21/6218
USPC ......................................................... 713/310
See application file for complete search history.

(56) References Cited

U.S. PATENT DOCUMENTS 5,944,794 A * 8/1999 Okamoto et al. .............. 709/225
7,523,506 B1 * 4/2009 Kumar et al. ................... 726/27
(Continued)

FOREIGN PATENT DOCUMENTS

JP　　2006-109545　　4/2006
JP　　2007-043483　　2/2007
(Continued)

OTHER PUBLICATIONS

Office Action of Notification of Reason for Rejection for Japanese Patent Application No. 2011-176935 Dated May 9, 2014, 8 pages.
(Continued)

*Primary Examiner* — Thomas Lee
*Assistant Examiner* — Santosh R Poudel
(74) *Attorney, Agent, or Firm* — Amin, Turocy & Watson, LLP

(57) ABSTRACT

An energy management system has an application storage, an application executing unit, a plurality of network interfaces, a policy setting unit configured to set whether each application should be permitted to access each of the network interfaces, a policy storage configured to store identification information for each application set by the policy setting unit, and access permit/inhibit information showing whether the application is permitted to access each of the network interfaces, an I/F management unit managing a correspondence relationship between a network address and each of the network interfaces, and to specify a network interface used by the application executed by the application executing unit, and an access controller configured to judge whether the application executed by the application executing unit is permitted to access the network interface to be used thereby, based on the access permit/inhibit information stored in the policy storage.

20 Claims, 20 Drawing Sheets

(51) Int. Cl.
  *G06F 1/32* (2006.01)
  *G06Q 10/04* (2012.01)
  *G06Q 50/06* (2012.01)
  *G06F 21/62* (2013.01)
  *G06F 21/81* (2013.01)
  *G06F 21/85* (2013.01)

(56) References Cited

U.S. PATENT DOCUMENTS

| | | | |
|---|---|---|---|
| 7,574,602 B2* | 8/2009 | Isozaki et al. | 713/168 |
| 7,607,032 B1* | 10/2009 | Marek et al. | 713/300 |
| 7,933,970 B2* | 4/2011 | Zimler et al. | 709/217 |
| 8,099,507 B2* | 1/2012 | Tanaka et al. | 709/228 |
| 8,544,078 B2* | 9/2013 | Lee | 726/11 |
| 8,682,732 B2* | 3/2014 | Poon et al. | 370/395.1 |
| 8,683,236 B2 | 3/2014 | Ukita et al. | |
| 2002/0116281 A1* | 8/2002 | Costello et al. | 705/26 |
| 2003/0117985 A1* | 6/2003 | Fujii et al. | 370/338 |
| 2004/0025061 A1* | 2/2004 | Lawrence | 713/300 |
| 2004/0064721 A1* | 4/2004 | Murching et al. | 713/200 |
| 2004/0088550 A1* | 5/2004 | Maste | 713/182 |
| 2004/0103320 A1* | 5/2004 | Storer et al. | 713/201 |
| 2004/0199763 A1* | 10/2004 | Freund | 713/154 |
| 2005/0050319 A1* | 3/2005 | Suraski | 713/164 |
| 2005/0125486 A1* | 6/2005 | Chrysanthakopoulos et al. | 709/201 |
| 2005/0234859 A1* | 10/2005 | Ebata | 707/1 |
| 2005/0273841 A1* | 12/2005 | Freund | 726/1 |
| 2005/0273850 A1* | 12/2005 | Freund | 726/14 |
| 2006/0137005 A1* | 6/2006 | Park | 726/21 |
| 2006/0150240 A1* | 7/2006 | Robinson et al. | 726/4 |
| 2007/0061482 A1 | 3/2007 | Higuchi | |
| 2007/0188303 A1* | 8/2007 | Faro et al. | 340/5.73 |
| 2007/0260885 A1* | 11/2007 | Yegani et al. | 713/171 |
| 2007/0263577 A1* | 11/2007 | Gallo et al. | 370/338 |
| 2008/0084470 A1* | 4/2008 | Hamilton | 348/14.09 |
| 2008/0109877 A1* | 5/2008 | Park et al. | 726/3 |
| 2008/0282314 A1* | 11/2008 | Abzarian et al. | 726/1 |
| 2009/0023446 A1* | 1/2009 | Das | 455/435.2 |
| 2009/0164649 A1* | 6/2009 | Kawato | 709/229 |
| 2009/0165113 A1* | 6/2009 | May et al. | 726/11 |
| 2009/0249464 A1* | 10/2009 | Chang et al. | 726/11 |
| 2010/0043066 A1* | 2/2010 | Miliefsky | 726/9 |
| 2010/0122314 A1* | 5/2010 | Zhang et al. | 726/1 |
| 2010/0165388 A1* | 7/2010 | Ikeura | 358/1.15 |
| 2010/0242084 A1* | 9/2010 | Keeni | 726/1 |
| 2010/0248690 A1* | 9/2010 | Biggs et al. | 455/411 |
| 2010/0293554 A1* | 11/2010 | Rastogi et al. | 719/313 |
| 2010/0333177 A1* | 12/2010 | Donley et al. | 726/4 |
| 2011/0023082 A1* | 1/2011 | Narasinghanallur et al. | 726/1 |
| 2011/0028126 A1* | 2/2011 | Lim et al. | 455/411 |
| 2011/0119745 A1* | 5/2011 | Bremner | 726/7 |
| 2011/0268000 A1* | 11/2011 | Kashikar et al. | 370/311 |
| 2012/0054841 A1* | 3/2012 | Schultz et al. | 726/6 |
| 2012/0159578 A1* | 6/2012 | Chawla et al. | 726/4 |
| 2012/0180119 A1* | 7/2012 | Bessis et al. | 726/11 |
| 2012/0291103 A1* | 11/2012 | Cohen | 726/4 |
| 2012/0291106 A1* | 11/2012 | Sasaki | 726/5 |
| 2012/0317609 A1* | 12/2012 | Carrara et al. | 726/1 |
| 2013/0024928 A1* | 1/2013 | Burke et al. | 726/12 |
| 2013/0054962 A1* | 2/2013 | Chawla et al. | 713/156 |
| 2013/0055359 A1* | 2/2013 | Sasaki | 726/4 |

FOREIGN PATENT DOCUMENTS

| | | |
|---|---|---|
| JP | 2007-258941 | 10/2007 |
| JP | 2009-212799 | 9/2009 |
| JP | 2011-150664 | 8/2011 |
| WO | 2008-153069 | 12/2008 |

OTHER PUBLICATIONS

Hiroshi Asano, SmartGrid Textbook, Impress Japan Co., Mar. 1, 2011, the first edition, pp. 9, 184-185, 196, and 252.
Office Action of Notification of Reason for Rejection for Japanese Patent Application No. 2011-176935 Dated Oct. 24, 2014, 10 pages.

* cited by examiner

| APPLICATION NAMES | APPLICATION IDENTIFICATION INFORMATION | POWER SYSTEM NETWORK I/F | REMOTE MANAGEMENT NETWORK I/F |
|---|---|---|---|
| APPLICATION A | xxx | PERMITTED | INHIBITED |
| APPLICATION B | yyu | PERMITTED | PERMITTED |
| APPLICATION C | zzz | INHIBITED | INHIBITED |
| APPLICATION D | aaa | INHIBITED | PERMITTED |
| ... | ... | ... | ... |

FIG.5

| IP ADDRESSES | I/F |
|---|---|
| AAA. BBB. CCC. DDD | POWER SYSTEM NETWORK I/F |
| BBB. CCC. DDD. EEE ~ CCC. DDD. EEE. FFF | REMOTE MANAGEMENT NETWORK I/F |
| EEE. GGG. HHH. III ~ JJJ. KKK. LLL. MMM | POWER SYSTEM NETWORK I/F |

FIG.9

| APPLICATION NAMES | APPLICATION IDENTIFICATION INFORMATION | POWER SYSTEM NETWORK A | POWER SYSTEM NETWORK B | REMOTE MANAGEMENT NETWORK I/F |
|---|---|---|---|---|
| APPLICATION A | xxx | PERMITTED | PERMITTED | INHIBITED |
| APPLICATION B | yyu | PERMITTED | INHIBITED | PERMITTED |
| APPLICATION C | zzz | INHIBITED | INHIBITED | INHIBITED |
| APPLICATION D | aaa | INHIBITED | INHIBITED | PERMITTED |
| APPLICATION E | zzz | INHIBITED | INHIBITED | INHIBITED |
| ... | ... | ... | ... | ... |

FIG.13

| APPLICATION NAMES | APPLICATION IDENTIFICATION INFORMATION | POWER SYSTEM NETWORK A | POWER SYSTEM NETWORK B | REMOTE MANAGEMENT NETWORK I/F |
|---|---|---|---|---|
| APPLICATION A | xxx | PERMITTED | PERMITTED | INHIBITED |
| APPLICATION C | yyu | PERMITTED | INHIBITED | PERMITTED |
| APPLICATION E | zzz | INHIBITED | INHIBITED | INHIBITED |
| ⋮ | ⋮ | ⋮ | ⋮ | ⋮ |

FIG.16

ENERGY MANAGEMENT DEVICE AND POWER MANAGEMENT SYSTEM

CROSS REFERENCE TO RELATED APPLICATIONS

This application is based upon and claims the benefit of priority from the prior Japanese Patent Application No. 2011-176935, filed on Aug. 12, 2011, the entire contents of which are incorporated herein by reference.

FIELD

Embodiments of the present invention relate to an energy management system and a power management system for managing power supplied from a power system and power consumed or generated by customers.

BACKGROUND

A plan to set up a next-generation power network (smart grid system) has been developed in order to stabilize the quality of power by using exhaustible energy based on nuclear power, thermal power, etc. together with renewable energy based on sunlight, wind power, etc.

In the next-generation power network, a system device such as an EMS (Energy Management System) is connected to the Internet to perform maintenance and to predict power demand. However, the Internet is threatened with computer viruses, information leak, illegal access, etc. Accordingly, there is a likelihood that such a system device as the EMS connected to the Internet causes problems with information security.

For example, conventional techniques generally used to prevent illegal access includes a technique of installing an intrusion detection system (IDS) on the network or EMS, and a technique of periodically applying patches for dealing with vulnerability (security defects). However, the system device, particularly the EMS, is different from a conventional server device such as a Web server in that the system device acquires information about electric generating capacity etc. from a device such as a remote terminal unit (RTU) through a power system network, and periodically transmits command signals for e.g. generating power at regular time intervals. Thus, restrictions on latency should be considered. Accordingly, it is impractical to perform such a complicated and heavily-loaded process as detecting illegal access by the system device. It is desirable that the system device can prevent illegal access from the Internet without affecting the original power control.

BRIEF DESCRIPTION OF THE DRAWINGS

FIG. 5 is a diagram showing a data structure example of the information registered in a policy storage.

FIG. 9 is a diagram showing an example of the table managed by an I/F management unit.

FIG. 13 is a diagram showing a structural example of the information managed by the policy storage.

FIG. 16 is a diagram showing a structural example of the data managed by an application execution management unit.

DETAILED DESCRIPTION

One aspect of an energy management system has an application storage configured to store at least one or more application including an application for power management, an application executing unit configured to execute an application stored in the application storage, a plurality of network interfaces arranged corresponding to a plurality of networks, respectively, a policy setting unit configured to set whether each application should be permitted to access each of the network interfaces, a policy storage configured to store identification information for each application set by the policy setting unit, and access permit/inhibit information showing whether the application is permitted to access each of the network interfaces, an I/F management unit configured to manage a correspondence relationship between a network address and each of the network interfaces, and to specify a network interface used by the application executed by the application executing unit, and a n access controller configured to judge whether the application executed by the application executing unit is permitted to access the network interface to be used thereby, based on the access permit/inhibit information stored in the policy storage.

First Embodiment

Figure 1:
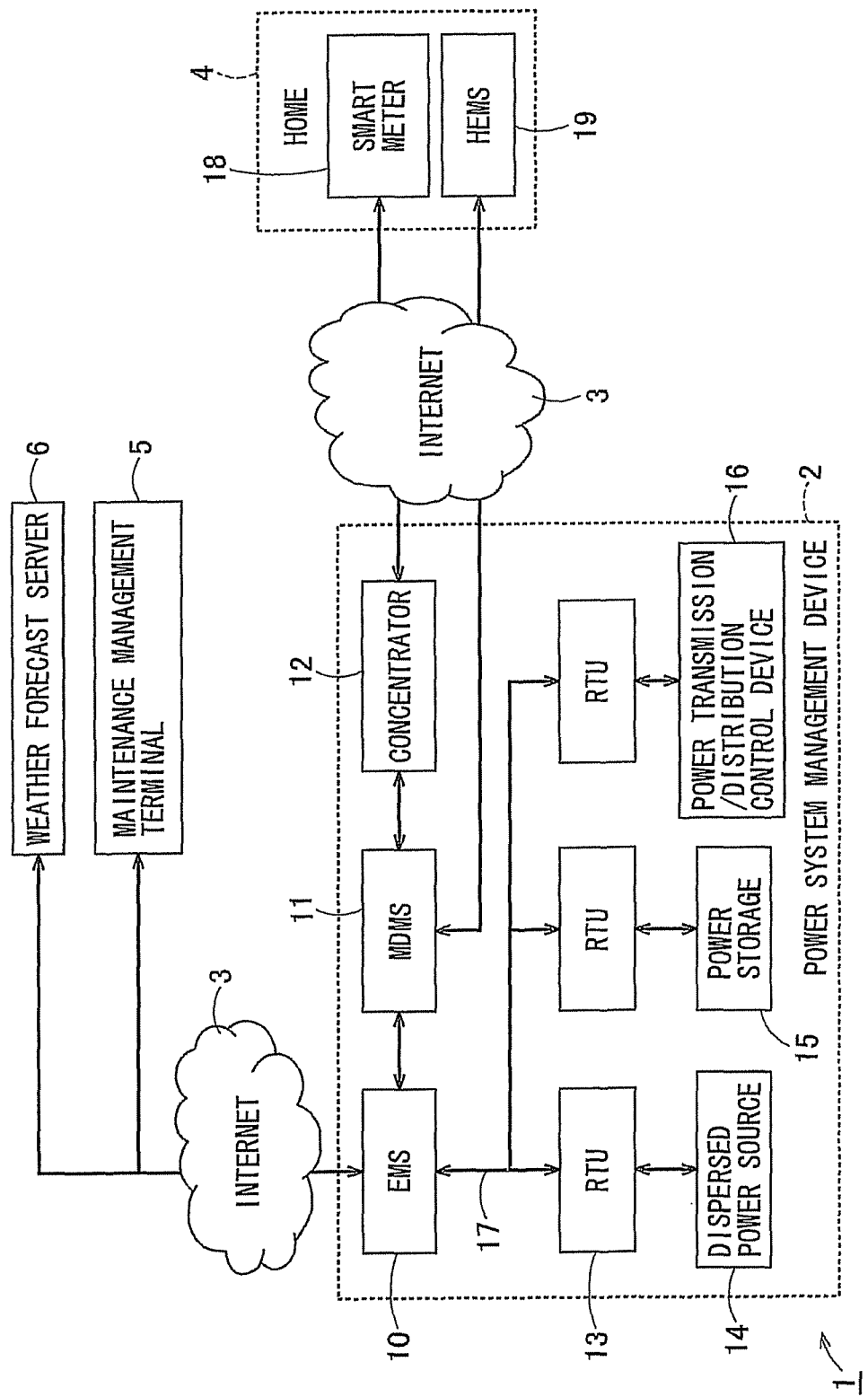
FIG. 1 is a block diagram showing a schematic structure of a power management system according to a first embodiment.

FIG. 1 is a block diagram showing a schematic structure of a power management system 1 having an energy management system (EMS) according to a first embodiment. The power management system 1 of FIG. 1 has a power system management device 2, a customer's power management device 4 which communicates with this power system management device 2 through Internet 3, and a maintenance management terminal 5 and a weather forecast server 6 which communicate with the power system management device 2 through the Internet 3.

The power system management device 2 has an EMS (energy management system) 10, an MDMS (Meter Data Management System) 11, a concentrator 12, RTUs (Remote Terminal Unit) 13, a distributed power source 14, a power storage 15, and a power transmission/distribution control device 16. The EMS 10, MDMS 11, and RTUs 13 in the power system management device 2 are connected to an internal network 17. This internal network 17 is also called a power system network or a private network.

The customer's power management device 4 is provided in each home, and has a smart meter 18 and a HEMS 19 (Home Energy Management System). When each home supplies surplus power generated by a solar battery panel etc. to the power system, a device for controlling the supply may be provided in the customer's power management device 4.

A relay 12 called a concentrator in the power system management device 2 classifies the smart meters 18 into groups each consisting of several smart meters 18 through the Internet 3, and the smart meters 18 communicate with the MDMS 11 through the internal network 17. The MDMS 11 receives and stores power use information about each home from the smart meter 18 at regular time intervals. The MDMS 11 is connected to the HEMS 19 through the Internet 3, and transmits such commands as restraining power demand and generating power to the HEMS 19.

The EMS 10 controls power by requesting the smart meter 18 and the HEMS 19 of each home to restrain power use, based on the power use of a plurality of homes aggregated by the MDMS 11 or the information from a sensor (not shown) arranged in the power system management device 2. Further, the EMS 10 controls the distributed power source 14 using solar power or wind power, the power storage 15, and the power transmission/distribution control device 16 each connected to the RTU 13, in order to stabilize the voltage and frequency of the entire smart grid system.

Further, the EMS 10 communicates with the maintenance management terminal 5 arranged in a remote location through the Internet 3, in order to perform such maintenance as collecting the log information accumulated in the EMS 10 and changing settings. The EMS 10 predicts power demand to control power supply and to restrain power demand. In this case, the EMS 10 acquires information required for the prediction, such as weather forecast of each district, from the weather forecast server 6 etc. through the Internet 3.

Note that the weather forecast server 6 is shown as an example, and any server can be used as long as it provides various information useful for power management.

In FIG. 1, the following each two components are connected to each other through the Internet 3: the EMS 10 and the maintenance management terminal 5; the MDMS 11 and the smart meter 18 arranged in each home; and the MDMS 11 and the HEMS 19 also arranged in each home. However, these each two components may be connected through a network device such as a bridge, a router, and a firewall (not shown) instead of being connected directly through the Internet 3. This improves security.

Further, in FIG. 1, the EMS 10 is connected to the RTUs 13 and the MDMS 11 through the internal network 17 (intranet), but the internal network 17 may be connected to a network device such as a bridge and a router (not shown). Note that the EMS 10 and the RTUs 13 may be connected through the Internet 3.

Figure 2:
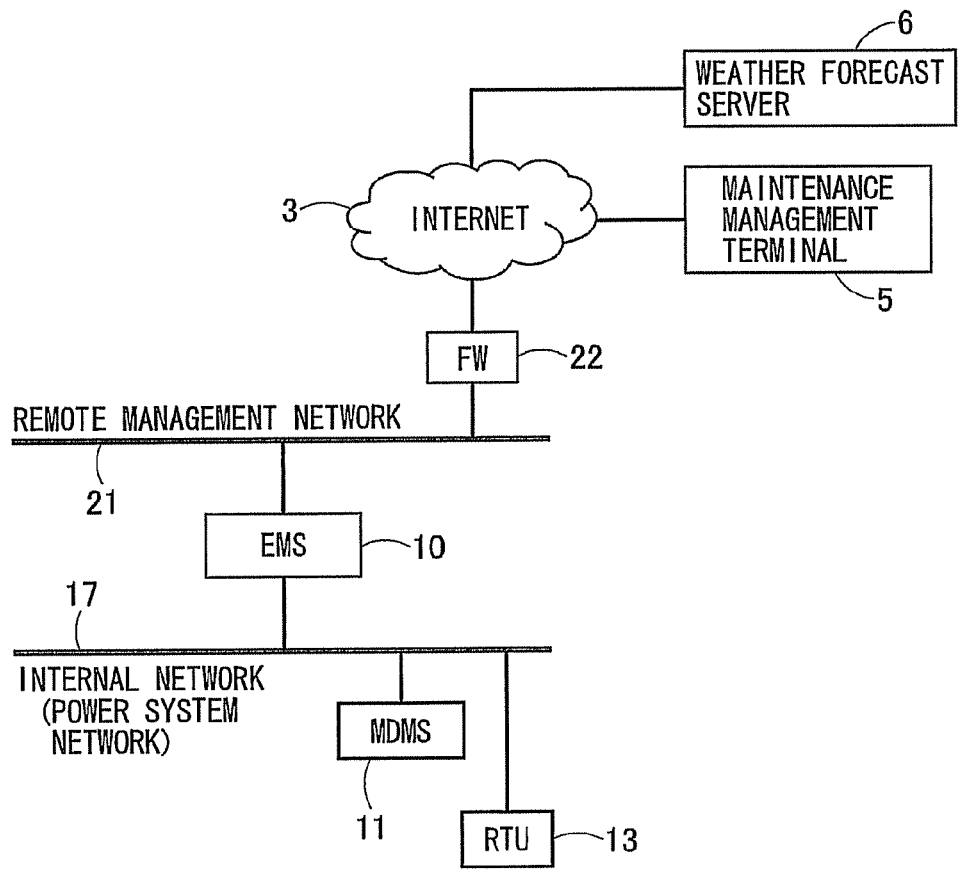
FIG. 2 is a block diagram showing a network configuration of an EMS according to the first embodiment.
Figure 3:
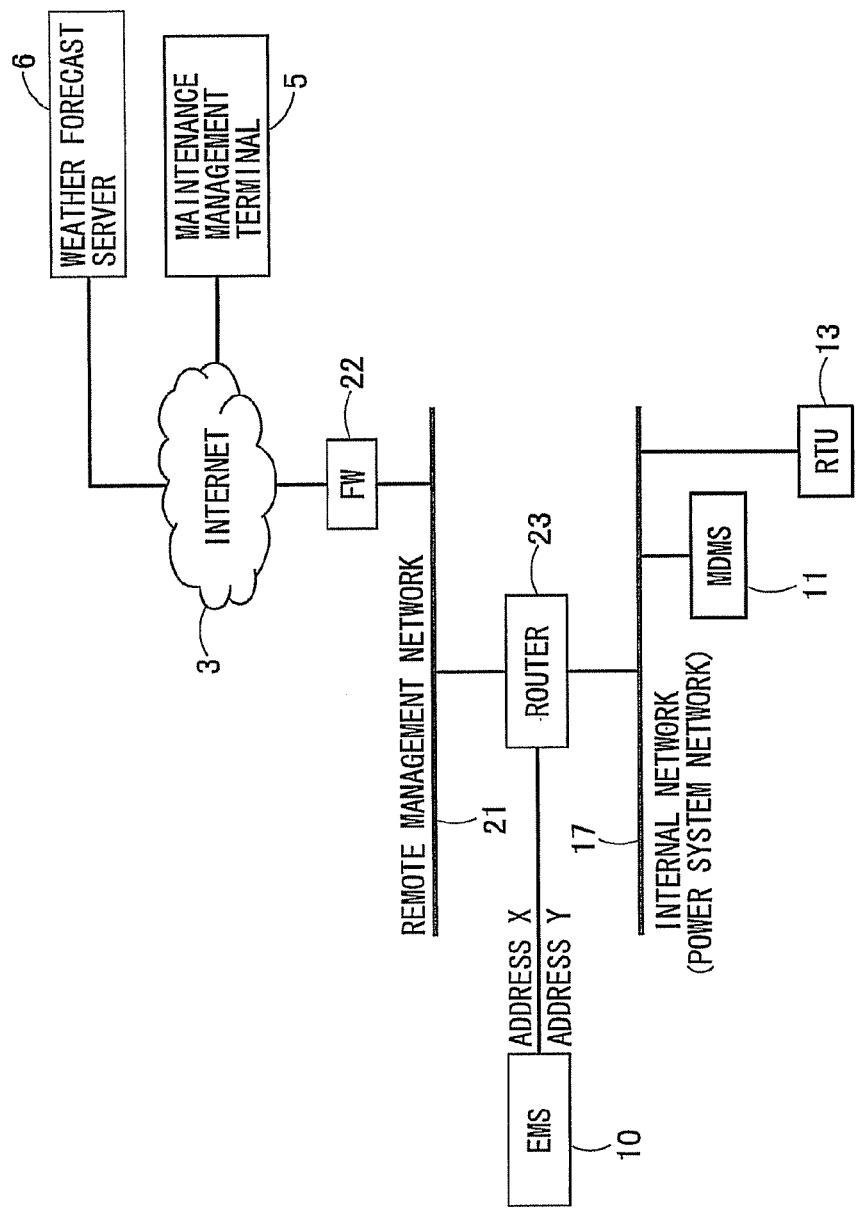
FIG. 3 is a block diagram showing another network configuration of the EMS.

Each of FIG. 2 and FIG. 3 is a block diagram showing a network configuration of the EMS 10. In the example of FIG. 2, the EMS 10, the MDMS 11, and the RTU 13 are connected to the internal network 17 (power system network 17). The EMS 10 is also connected to a remote management network 21, and this remote management network 21 is connected to the Internet 3 through a gateway (GW)/firewall (FW) 22. The weather forecast server 6 and the maintenance management terminal 5 are connected to the Internet 3, and the EMS 10 communicates with the weather forecast server 6 and the maintenance management terminal 5 through the remote management network 21, the firewall 22, and the Internet 3.

Further, in the example of FIG. 3, the EMS 10 is connected to the internal network 17 through a router 23. The MDMS 11 and the RTUs 13 are connected to the internal network 17. The remote management network 21 is also connected to the router 23.

Each of FIGS. 2 and 3 shows an example, and another network configuration may be employed. Note that the EMS 10 in the present embodiment has an interface for connection to the Internet 3 and an interface for connection to the internal network 17, as a fundamental network function. Any network configuration can be employed as long as this function is provided.

Note that various configurations such as Ethernet (registered trademark) and a wireless LAN based on IEEE 802.11 can be employed in a physical layer and a link layer of each of the remote management network 21 and the power system network 17. When using the Internet protocol (IP) in a network layer, it may be IPv4 or IPv6.

In the example shown in FIG. 2, the EMS 10 physically has two networks interfaces (hereinafter referred to as network I/Fs) in order to be connected to two networks. However, as shown in FIG. 3, by assigning two or more IP addresses to the EMS 10, the EMS 10 may have physically one network I/F while having logically a plurality of interfaces. In this case, the router 23 is configured to transfer a packet transmitted from an address X of the EMS 10 to the remote management network 21, and to transfer a packet transmitted from an address Y to the power system network 17.

Figure 4:
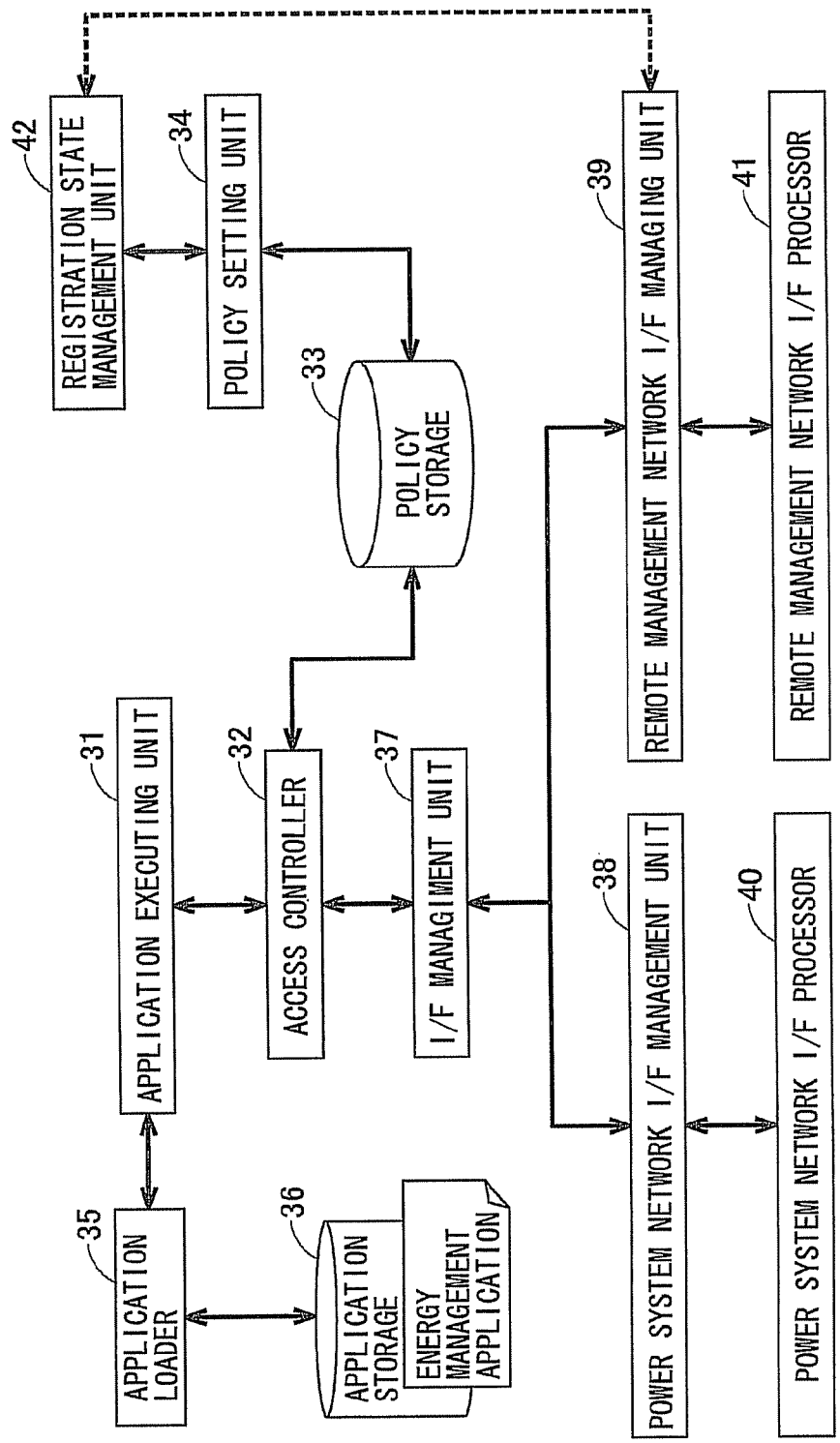
FIG. 4 is a block diagram showing a schematic structure of the EMS according to the first embodiment.

FIG. 4 is a block diagram showing a schematic structure of the EMS 10 according to the present embodiment. The EMS 10 shown in FIG. 4 has an application executing unit 31, an access controller 32, a policy storage 33, a policy setting unit 34, an application loader 35, an application storage 36, an I/F management unit 37, a power system network I/F management unit 38, a remote management network I/F managing unit 39, a power system network I/F processor 40, a remote management network I/F processor 41, and a registration state management unit 42.

The application storage 36 stores applications executed by the EMS 10. Here, the applications are program modules. For example, the applications include a program module which acquires power consumption information by communicating with the MDMS 11, and adjusts power supply by calculating a power supply-demand prediction and communicating with the RTUs 13. Further, the applications include a program module which receives an instruction as to what kind of log information should be recorded, by communicating with the maintenance management terminal 5 connected through the Internet 3, and transmits the log information etc. to the maintenance management terminal 5.

The program module may be implemented as hardware, software, or combination thereof. Here, explanation will be given on an example where the program module is implemented as a software module. In the example shown in FIG. 4, an energy management application is stored in the application storage 36, but another application may be stored in the application storage 36.

The application loader 35 loads the application stored in the application storage 36 as needed. The application may be loaded based on the instruction by a user, may be periodically loaded at a scheduled time in each day, may be loaded when a specific event occurs such as when power consumption exceeds a certain threshold value, or may be loaded by receiving a predetermined signal from the network.

The application executing unit 31 executes the application loaded by the application loader 35. It is premised that a plurality of applications are simultaneously executed. Further, it is premised that an application for controlling the devices connected to the power system network 17 and acquiring data therefrom is a separate application from an application for maintenance (e.g., as software modules in different files). Note that a plurality of applications are not necessarily executed simultaneously, and only one application may be executed depending on the situation.

When the application specifies a destination device to be connected, the I/F management unit 37 determines whether the data (packet) transmitted and received by the application should be processed by the power system network I/F management unit 38 or by the remote management network I/F managing unit 39. The destination device is specified using an IP address for example. In this case, the I/F management unit 37 determines which one of the I/F management units 38 and 39 should process the data based on the destination IP address included in the packet transmitted from the application.

The power system network I/F management unit 38 performs data link layer processing, network layer processing, and transport layer processing to communicate with a device connected to the power system network 17. On the other hand, the remote management network I/F managing unit 39 performs data link layer processing, network layer processing, and transport layer processing to communicate with a device connected to the remote management network 21 or the maintenance management terminal 5.

When both of the power system network 17 and the remote management network 21 uses TCP/IP as network protocol, the IP address assigned to the power system network 17 and the IP address assigned to the remote management network 21 are different from each other, but there is no difference between the I/F management units 38 and 39 in their processing.

When both of the I/F management units 38 and 39 completes their processing, the power system network I/F processor 40 or the remote management network I/F processor 41 performs its processing. The power system network I/F processor 40 performs physical layer processing to communicate with the power system network 17. The remote management network I/F processor 41 performs physical layer processing to communicate with a device connected to the remote management network 21.

The power system network I/F management unit 38 and the power system network I/F processor 40 forms a private network I/F, while the remote management network I/F managing unit 39 and the remote management network I/F processor 41 forms a public network I/F. In the present embodiment, two network I/F processors are arranged, but three or more network I/F processors may be arranged. In this case, the I/F management unit 37 selects arbitrary one network I/F processor.

As shown in FIG. 2, the EMS 10 connected to two different networks (the internal network 17 and the remote management network 21) has two physical interfaces. These physical interfaces correspond to the power system network I/F processor 40 and the remote management network I/F processor 41 respectively.

Further, in the network configuration shown in FIG. 2, the power system network 17 and the remote management network 21 are assigned different network addresses (e.g., IP addresses). The I/F management unit 37 determines which one of the network I/Fs should be used by searching the destination IP address specified by the application in network address ranges for the power system network 17 and the remote management network 21.

The policy storage 33 accumulates access permit/inhibit information (policies) determining which network I/F is permitted to be accessed by each application. In other words, the policy storage 33 relates each application identification information to access permit/inhibit information showing whether the application is permitted to access each of the network I/Fs, and stores the relation.

The policy setting unit 34 sets policies for the policy storage 33. In other words, the policy setting unit 34 sets whether each application is permitted to access each of the network I/Fs. Data structure of the policy and how to set it will be mentioned later.

The access controller 32 controls access by acquiring a policy from the policy storage 33 based on a request for using a network I/F from the application, comparing the policy with the request, and judging whether the application is permitted to access the network I/F. The processing for access control will be mentioned in detail later.

The EMS 10 in the present embodiment performs two kinds of processes as an application registration phase and an access control phase. In the application registration phase, applications permitted to use each network are previously registered before each application uses the network I/F. On the other hand, in the access control phase, whether an application is permitted to use each interface is judged when the application actually uses the network I/F.

First, processing steps for the application registration phase performed by the EMS 10 will be explained. In the application registration phase, the policy setting unit 34 registers, in the policy storage 33, which application is permitted to access which network I/F.

FIG. 5 is a diagram showing a data structure example of the information registered in the policy storage 33. As shown in FIG. 5, the policy storage 33 registers therein application identification information, access permit/inhibit information for the power system network I/F, and access permit/inhibit information for the remote management network I/F, with respect to each application. The application identification information is information for identifying each application. One of the following three items or an arbitrary combination thereof is treated as the information for identifying each application:

(a) the location where the application program file is stored (path name+file name);
(b) the process name or process identification information given when executing the application; and
(c) the hash value of the application program.

As stated above, the policy storage 33 registers the access permit/inhibit information showing which network I/F is permitted to be accessed, depending on the kind of each application. For example, an application which transmits a command for restraining power demand to the MDMS 11 through the power system network 17 is permitted to access the power system network I/F, but inhibited to access the remote management network I/F.

Similarly, an application which acquires power generation information from the RTU 13 and transmits a command for generating power to the RTU 13 is permitted to access the power system network I/F, but inhibited to access the remote management network I/F.

On the other hand, an application which transmits log information to the maintenance management terminal 5 through the Internet 3 is permitted to access the remote management network I/F, but inhibited to access the power system network I/F. Similarly, an application which acquires weather information from the server on the Internet 3 through the Internet 3 is permitted to access the remote management network I/F connected to the Internet 3, but inhibited to access the power system network I/F. Further, an application which does not use network functions such as recording log information is inhibited to access both of the network I/Fs.

As mentioned later, when setting a rule to inhibit an unregistered application from accessing every network I/F, policies concerning the applications using each network I/F should be registered in the policy storage 33. In this case, it is not required to specifically register the applications inhibited to access each network I/F, which saves the effort of registering applications.

In the EMS 10 generally known, applications communicating with the maintenance management terminal 5 use the power system network I/F. The present embodiment is advantageous in setting that any application is inhibited to access the power system network I/F as long as the policy for the application is not specifically registered in the policy storage 33.

Particularly, the present embodiment is extremely useful when the application functions as a so-called server permitting access from the outside. These days, there are never-ending cybercrimes due to illegal access, such as intrusion into a device and illegally acquiring data by illegally acquiring administrator authority from the Internet 3. The EMS 10 not only predicts power supply and demand but also transmits a power demanding command to the devices other than the EMS 10, such as the RTUs 13. Accordingly, if the data in the EMS 10 is illegitimately modified or an unauthorized power demanding command is transmitted to the devices other than the EMS 10, supply and demand cannot be managed correctly and supply-demand balance is disturbed, which leads to a risk of a large-scale disaster such as power failure.

Particularly, when an application accessible from the Internet 3 provides server functions, if administrator authority is illegally acquired due to an implementation error or a setting error of the application, illegal data can be transmitted by an attacker to the power system network 17 through the Internet 3, which leads to such security risks that illegal commands are transmitted to the devices such as the RTUs 13 and the MDMS 11 and that the EMS 10 is used as a stepping stone for hacking into the RTUs 13 and the MDMS 11. When network I/Fs accessible from each application are limited, even if an attacker gets control of an application using vulnerability included in the application and hacks into the EMS 10 from the remote management network 21, the attacker cannot transmit illegal packets to the power system network 17 using the application.

The registration state management unit 42 determines whether the policy storage 33 is in a state allowing an application to be registered. As stated above, only the policy setting unit 34 can register applications in the policy storage 33. When the policy setting unit 34 registers an application in the policy storage 33, the registration state management unit 42 confirms whether the policy setting unit 34 is in a state permitting an application to be registered (registration permit state). If in a registration inhibit state, application registration by the policy setting unit 34 is inhibited, and if in a registration permit state, application registration by the policy setting unit 34 is permitted. This prevents applications from being illegally registered.

As stated above, there is a security risk that an attacker hacks into the EMS 10 through the remote management network 21 and registers in the policy setting unit 34 information for permitting access to each network I/F from an application which is not originally permitted. In order to prevent this risk, it is required to confirm whether registration of the policy is conducted by an authorized operator.

Note that one of the following three states or an arbitrary combination thereof is treated as the registration permit state recognized by the registration state management unit:
(a) when no application transmits/receives packets using the remote management network I/F managing unit 39 (when network connection through the remote management network 21 is not established);
(b) when it is confirmed the policy setting unit 34 performs registration in the policy storage 33 based not on an input from the remote management network I/F managing unit 39 but on an input from a keyboard; and
(c) when no packet is transmitted/received using the power system network I/F management unit 38.

Figure 6:
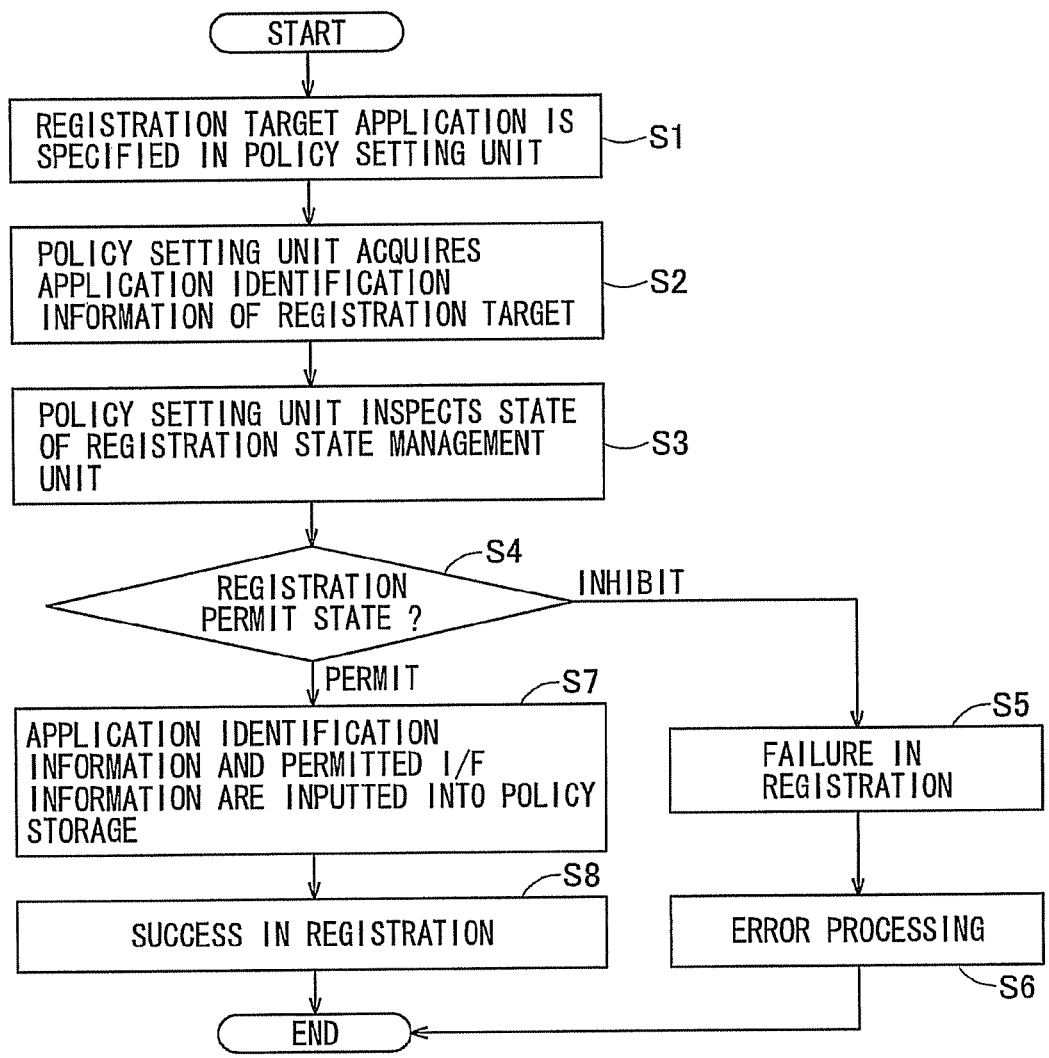
FIG. 6 is a diagram showing an example of the procedure applied when a policy setting unit registers an application.

FIG. 6 is a flow chart showing an example of the processing steps when the policy setting unit 34 registers an application in the policy storage 33. First, a registration target application is selected, and the registration target application is specified in the policy setting unit 34 (Step S1). Next, the policy setting unit 34 or the policy storage 33 acquires application identification information of the registration target (Step S2). These steps may be performed before the EMS 10 is connected to each network, or may be performed when installing the application after establishing network connection.

The application identification information may be acquired through manual input by an operator. In the example explained below, the policy setting unit 34 automatically acquires the information. As a preliminary process, an application developer incorporates application identification information in a file of an application package.

Figure 7:
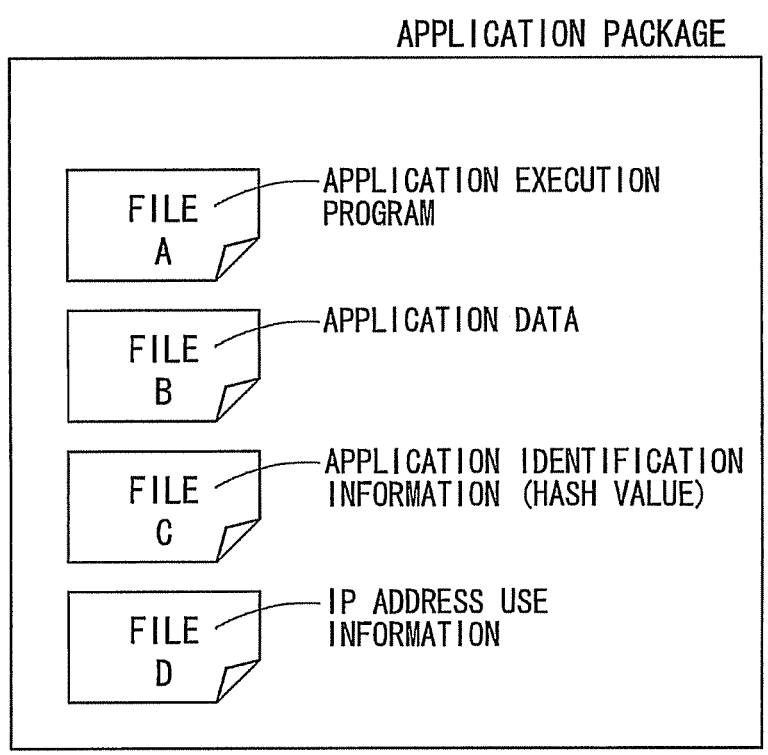
FIG. 7 is a diagram showing an example of the file structure of an application package.

FIG. 7 is a diagram showing the file structure of an application package. In FIG. 7, the hash value of an application execution program is used as the application identification information. The application identification information may be an ID or a file name (package name) uniquely set by the application developer as long as its information is a value capable of identifying the application. As shown in FIG. 7, the application package includes a plurality of files. These files include, e.g., an application execution program serving as an entity of the application, application data including setting data, installer, etc., and application identification information (hash value).

Note that a file describing information showing as which network I/F should be used by the application may be optionally included.

Prior to the install of the application, the application developer calculates the application identification information (hash value) when generating the application, and distributes it with a package file.

The policy setting unit 34 calculates the hash value of an application execution program installed in the EMS 10, or the hash value included in a file of an application package, to use the hash value as the application identification information.

After completely acquiring information required to register the application, the policy setting unit 34 inspects the state of the registration state management unit 42 (Step S3). Whether the registration state management unit 42 is in the registration permit state is judged (Step S4), and if not in the registration permit state (Step S5), error processing is performed (Step S6), and subsequent processes are not performed. If in the registration permit state, the policy setting unit 34 registers the acquired information in the policy storage 33 (Step S7). At this time, the hash value of the application execution program installed in the EMS 10 is calculated, and whether the calculated value corresponds to the hash value included in a file included in the application package is inspected. If correspondence is confirmed, the application is registered with its hash value. Further, at this time, if the hash value of the application package included in an application package file is signed with a secret key of the application developer and the policy storage 33 previously installs a public key corresponding to the secret key, the policy setting unit 34 verifies the signature with the public key when registering the application and registers it when the signature verification is successfully completed. In this way, signature verification can guarantee that the application is developed by a reliable application developer and that the application package is not altered.

Note that the signature may be added to the hash value of the application package or to a specific file (e.g., application execution file or application identification information) in the application package. After that, the policy setting unit 34 registers, in the policy storage 33, the application identification information and access permit/inhibit information showing which one of the power system network I/F and the remote management network I/F is permitted to be accessed (Step S7). This leads to the end of application registration (Step S8).

If information showing which network I/F should be accessed by the application is included in the application package as the access permit/inhibit information showing which interface is permitted to be accessed, the information may be used. If not included, an administrator may select an accessible interface depending on the kind of the application. If the application package includes IP address use information and the IP address use information indicate the application execution file connects to a device which has the IP address, the IP address use information may be used and registered Note that the format of the IP address use information may be based on an IP address (123.456.789.123) or on a DNS domain name (bar.foo.com).

Figure 8:
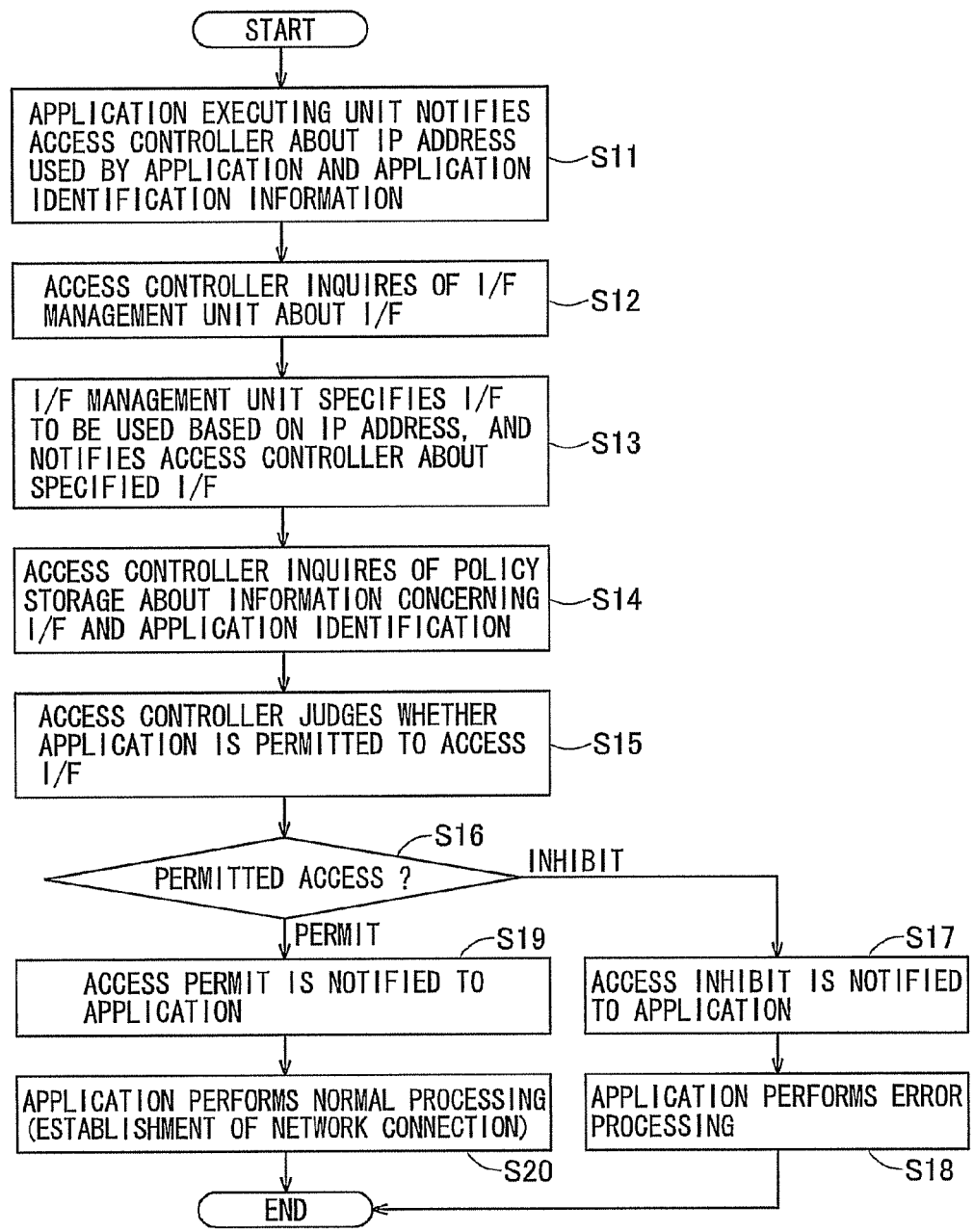
FIG. 8 is a diagram showing an example of the processing steps performed by an application executing unit and an access controller.

Next, processing steps performed by the EMS 10 in the access control phase will be explained. FIG. 8 is a flow chart showing an example of the processing steps performed by the application executing unit 31 and the access controller 32 in the access control phase. First, the application executing unit 31 notifies the access controller 32 about the IP address (or DNS domain) used by an application and application identification information (Step S11). The IP address and application identification information may be notified to the access controller 32 by the application execution program itself. Further, IP address use information and application identification information included in the application package may be acquired by the application executing unit 31 and notified to the access controller 32 before executing the application. The access controller 32 inquires of the I/F management unit 37 which one of the power system network and the remote management network 21 should be accessed from the received IP address (Step S12).

Note that when a DNS domain name is used instead of the IP address, the DNS domain name may be converted into an IP address by a DNS server before the notification to the I/F management unit 37.

FIG. 9 is a diagram showing an example of the table managed by the I/F management unit 37. This management table manages which IP address corresponds to which network I/F. As shown in FIG. 9, each network I/F may correspond to an IP address on a one-on-one basis, or each network I/F may correspond to an address range. The I/F management unit searches which network I/F corresponds to the IP address specified by the access controller 32 in the table, and replies the network I/F name to the access controller 32 (Step S13).

The access controller 32 inquires of the policy storage 33 whether access to the network I/F is permitted (Step S14). The policy storage 33 replies to the access controller 32 a permit or inhibit based on the table shown in FIG. 5. The access controller 32 judges whether the application is permitted to access the network I/F as the application requested, based on the reply from the policy storage 33 (Steps S15 and S16).

If the access is inhibited, the inhibit is notified to the application executing unit 31 or the application (Step S17), and the application performs error processing (Step S18). Certainly, there is a try to establish connection with a device on a network by using a network I/F therefor with an application being executed, which is inhibited though, establishment of the connection is inhibited. If access to the network I/F is permitted, the application is notified about the permit (Step S19), and the application successfully establishes network connection with a device on the network (Step S20).

Note that access to the network I/F may be permitted/ inhibited using such a mechanism as network filtering devices, as commonly used by firewall devices. Further, the access controller 32 may block a command for establishing network connection when it is notified to an operating system.

In FIG. 8, the access controller 32 inquires of the I/F management unit 37 which network I/F should be accessed by the application, but the application executing unit 31 may inquire of the I/F management unit 37 about the network I/F instead.

Figure 10:
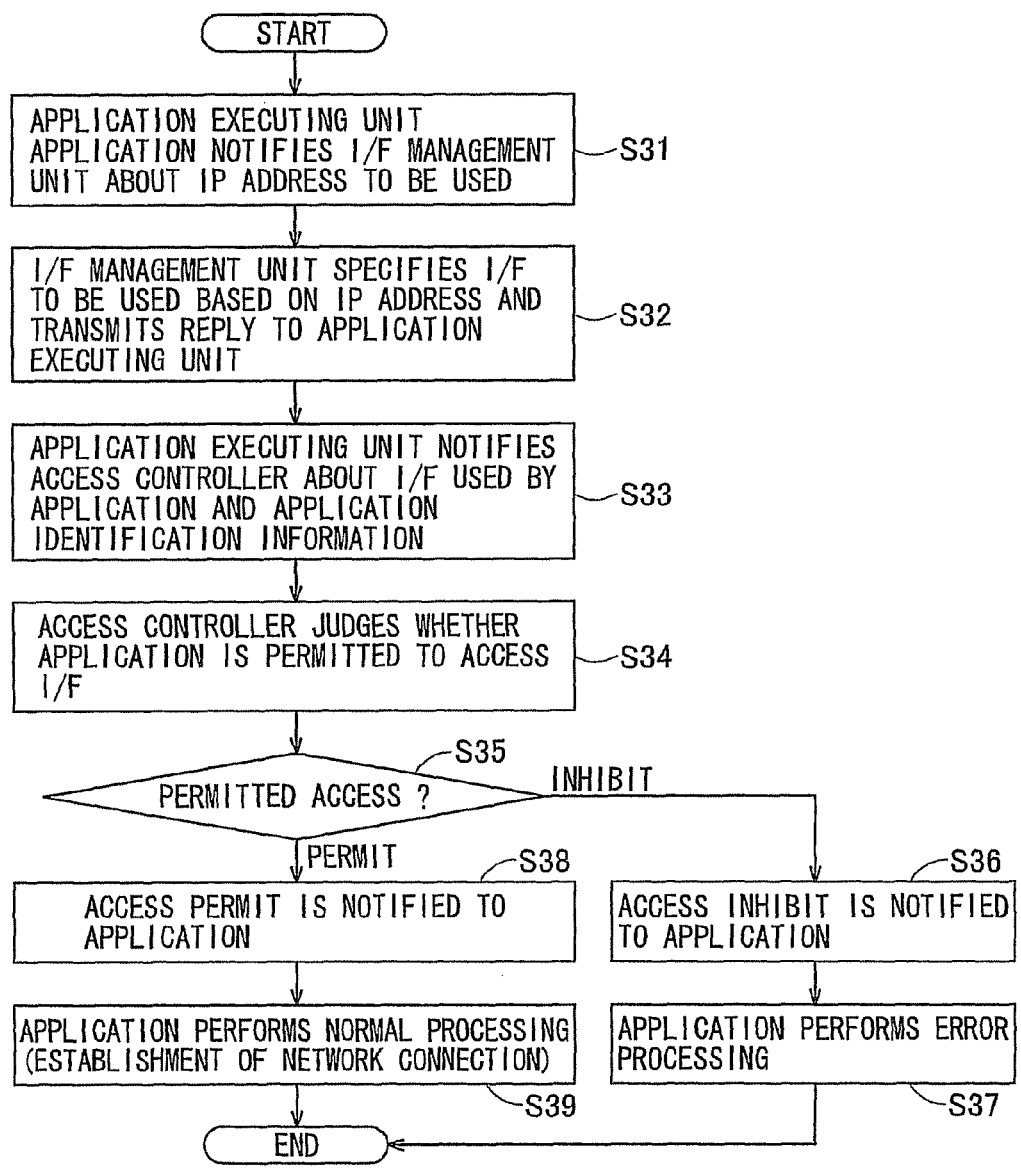
FIG. 10 is a diagram showing an example of the processing steps when inquiring of a network I/F.

FIG. 10 is a flow chart showing an example of the processing steps when the application executing unit 31 inquires of the I/F management unit 37 about the network I/F. First, the application executing unit 31 inquires of the I/F management unit 37 about the IP address used by an application (Step S31). The I/F management unit 37 specifies a network I/F in accordance with the table of FIG. 9, and transmits a reply to the application executing unit 31 (Step S32). The application executing unit 31 notifies the access controller 32 about the network I/F accessed by the application and application identification information (Step S33). Subsequent processing steps (Steps S34 to S39) performed by the access controller 32 are the same as Steps S15 to S20 in FIG. 8.

In this case, it is required for the application developer to inevitably agree to incorporate a process for inquire the I/F management unit 37 which network I/F should be used, before using network connection.

Next, another example for managing the correspondence between IP addresses and network I/Fs will be shown. As one of the characteristics of a next-generation power network, network configuration is managed by a device. In the general Internet 3, each network administrator operates and manages a local network in which a specific domain name or IP address is assigned to each device, and there is no administrator who can uniformly manage the devices on all local networks. However, in the next-generation power network, network topology information is managed, the network topology information showing which internal network 17 (power system network 17) is connected to the distributed power source 14, power storage 15, etc. shown in FIG. 1 and what kind of network configuration is employed to manage respective power system networks 17. More concretely, as typified by IEC 61850 standards (CIM (Common Information Model)), how to describe a network topology model is specified. That is, in the next-generation power network, a mechanism for updating the database is used when a device such as the power storage 15 is newly connected to the next-generation power network (the power system network 17) or when network connection is disconnected due to power failure or maintenance. The database may be managed by the EMS 10 or by a device dedicated to a CIM database. Hereinafter, explanation will be given on the case where the EMS 10 manages the CIM database.

Figure 11:
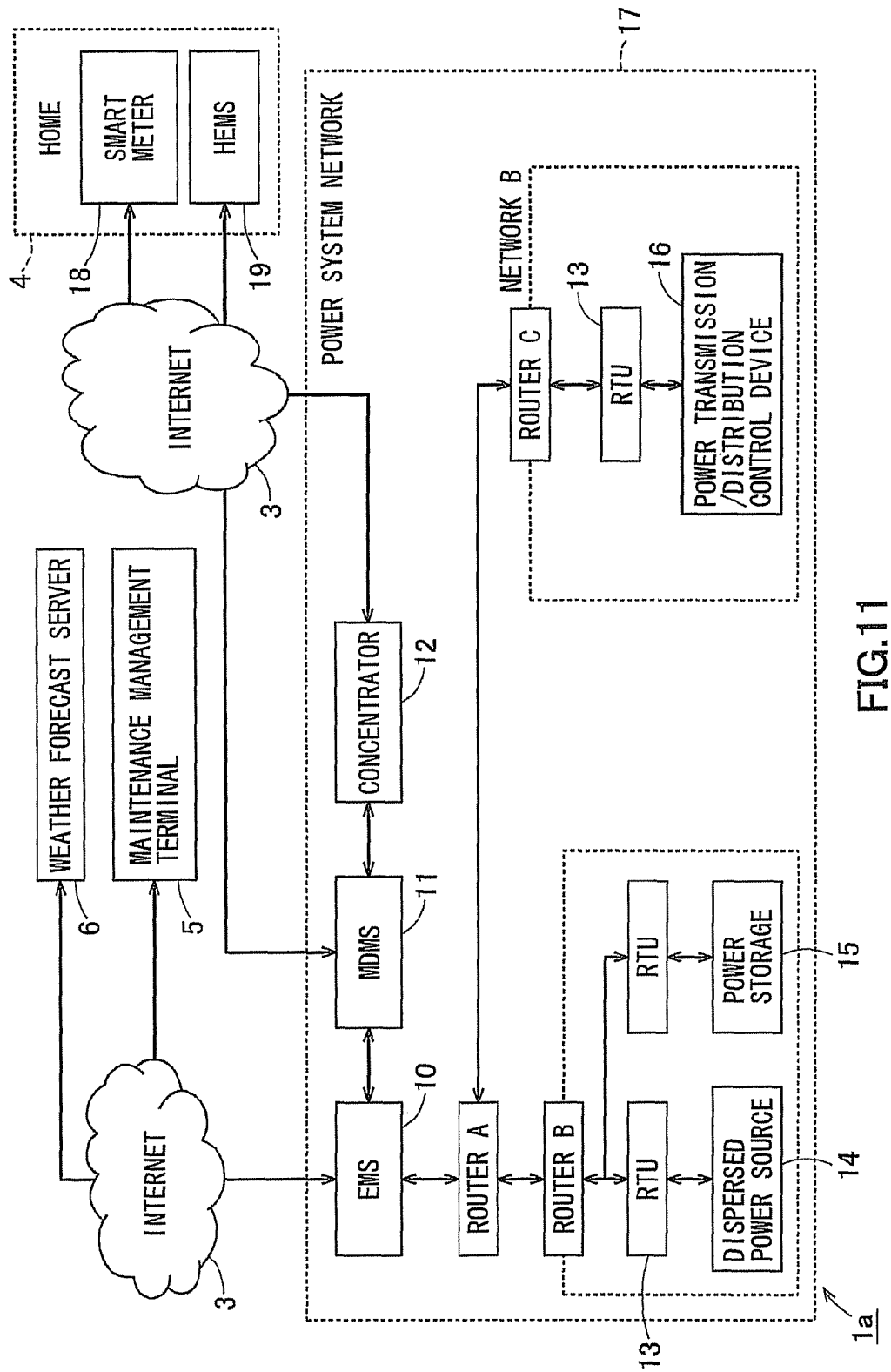
FIG. 11 is a block diagram showing a schematic structure of a power management system.

FIG. 11 is a block diagram showing a schematic structure of a power management system is according to a first modification example of the first embodiment. In the example explained in FIG. 1, the EMS 10 and all of the RTUs 13 are connected to the common internal network 17, while in FIG. 11, the power system management device 2 includes a plurality of power system networks connected to each other through routers.

More concretely, in FIG. 1, a network to which the EMS 10, RTUs 13, etc. in the power system management device 2 are connected is collectively referred to as the internal network 17 (power system network 17), while in the power system management device 2 shown in FIG. 11, the distributed power source 14, the power storage 15, and the RTUs 13 connected thereto are connected to a network A in the power system network 17, and the power transmission/distribution control device 16 and the RTU 13 connected thereto are connected to a network B in the power system network 17. Further, the network A and the network B are connected to the EMS 10 through a router A.

In the example shown below, the EMS 10 controls access using a CIM database (CIM DB) to specify which one of the power system network 17 and the remote management network 21 includes the device to be connected to the application, and to specify that the application tries to connect to which network or device in the power system network 17. That is, the power management system 1a of FIG. 11 can manage not only whether the application is allowed to be connected to the weather forecast server 6 or the RTUs 13 but also whether the application is allowed to be connected to the RTU 13 connected to the distributed power source 14 (a device in the network A) or whether the application is allowed to be connected to the RTU 13 connected to the power transmission/distribution control device 16 (a device in the network B).

Figure 12:
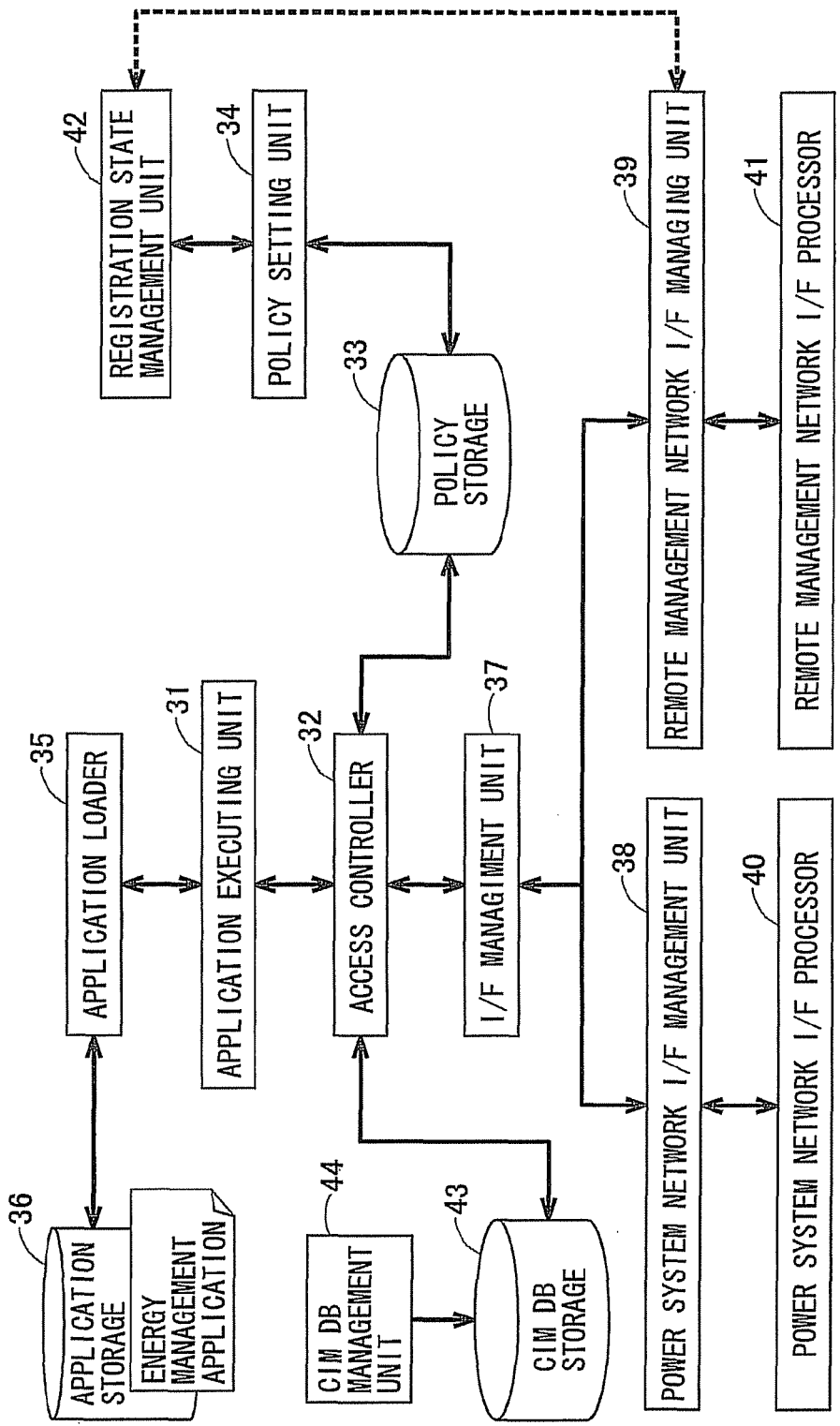
FIG. 12 is a block diagram showing an example of the internal structure of the EMS of FIG. 11.

FIG. 12 is a block diagram showing an example of the internal structure of the EMS 10a of FIG. 11. The EMS 10a of FIG. 12 is different from FIG. 4 in further having a CIM DB storage 43 and a CIM DB management unit 44. The CIM DB storage 43 stores the data of the above-mentioned CIM database. When network connection is changed, such as when a device is connected to the network or when a device is disconnected from the network, the CIM DB management unit 44 receives a message showing the change from an external device, notifies the CIM DB storage 43 about the change, and rewrites the data of the CIM DB storage 43 so that the network configuration and the data of the CIM DB storage 43 are consistent with each other.

FIG. 13 is a diagram showing a structural example of the information managed by the policy storage 33. The policy storage 33 of FIG. 13 is different from FIG. 5 in managing the use permit information about the network A and the network B in the power system network 17, in addition to the use permit information about the remote management network I/F.

Figure 14:
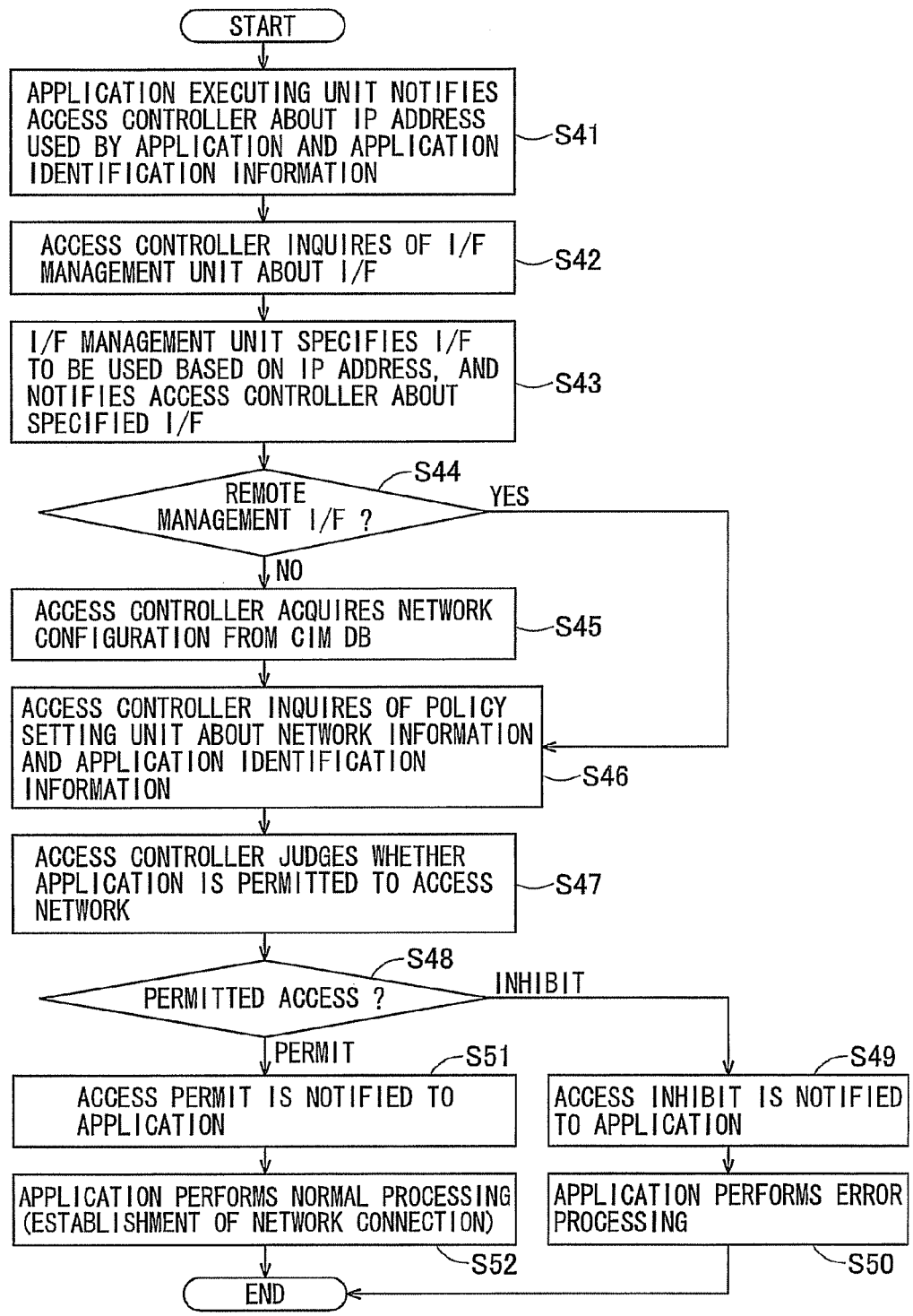
FIG. 14 is a diagram showing an example of the processing steps for access control.

FIG. 14 is a flow chart showing the processing steps for access control performed by the EMS 10a of FIG. 13. Processing steps performed by the EMS 10a of FIG. 13 for registration in the policy storage 33 are different from FIG. 6 only in that each application additionally includes access permit information for the network A and the network B. Accordingly, explanation therefor will be omitted.

In FIG. 14, processing steps S41 to S43 in which the application executing unit 31 specifies an interface using the I/F management unit 37 are similar to Steps S11 to S13 in FIG. 8. After that, whether the specified interface is the remote management I/F is judged (Step S44). If it is not the remote management network I/F but the power system network I/F, the access controller 32 acquires network configuration from the CIM DB storage 43 (Step S45). Then, the access controller 32 inquires of the policy storage 33 whether the application is permitted to access a required network (network A, network B, or remote management network 21), thereby whether the access is permitted being judged. Subsequent processing steps (Steps S46 to S52) are the same as Steps S14 to S20 in FIG. 8.

As stated above, in the first embodiment, the policy setting unit 34 judges whether each application is permitted/inhibited to access each network I/F, and stores the information in the policy storage 33, which makes it possible to determine whether the application executed by the application executing unit 31 is permitted to access a specified network I/F simply and quickly. Accordingly, it is possible to inhibit an illegal application from accessing each network I/F, which means that illegal network access can be prevented without affecting the original power control.

Further, by arranging the CIM DB storage 43 for storing a detailed network configuration of the power system network 17, it is possible to configure whether each network in the power system network 17 is permitted to be accessed by each application. Since access restriction can be set for each network in the power system network 17, illegal access can be prevented more comprehensively.

Second Embodiment

In the first embodiment, applications using network I/Fs are previously registered, and each application, when using a network I/F, inquires of the EMS 10a whether the application is permitted/inhibited to use the network I/F. If a registered policy shows that the application is permitted to use the network I/F, access to a specified network I/F is permitted, and if not, the access is inhibited, by which only each specified application can use a specified network I/F. That is, in the first embodiment, each application judges access control thereon before establishing network connection with a device on the network. On the other hand, in a second embodiment, each application automatically judges access permit/inhibit for each network I/F when establishing network connection with a device on the network.

Figure 15:
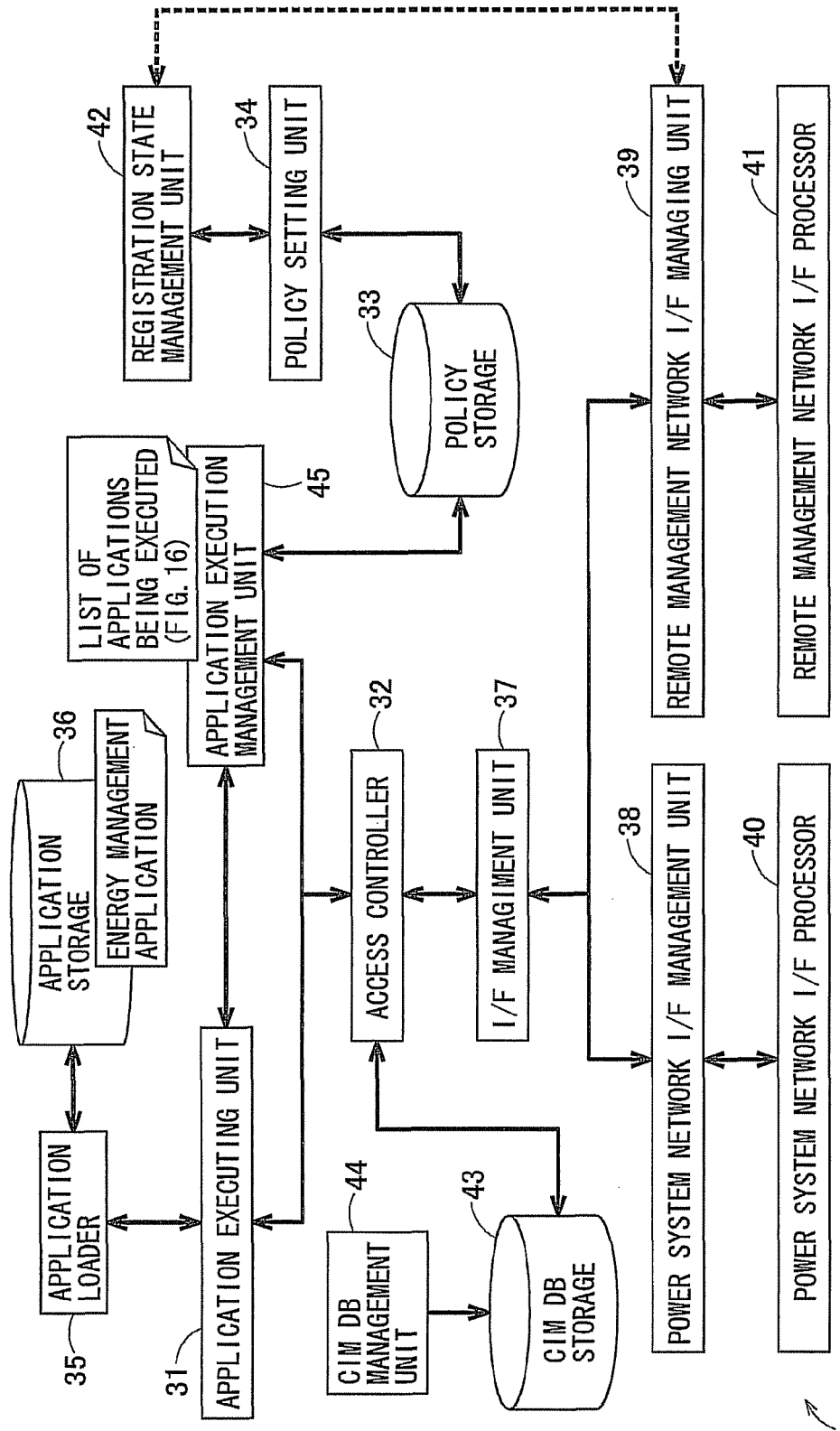
FIG. 15 is a block diagram showing a schematic structure of an EMS according to a second embodiment.

FIG. 15 is a block diagram showing a schematic structure of an EMS 10b according to the second embodiment. The EMS 10b of FIG. 15 is different from the block diagram of FIG. 4 in further having an application execution management unit 45. As stated above, the EMS 10b may execute a plurality of applications simultaneously. In the second embodiment, when execution of an application is started, the application being executed is registered in the application execution management unit 45. When execution of the application is terminated, the application is eliminated from the application execution management unit 45. That is, the application execution management unit 45 manages the applications currently being executed.

FIG. 16 is a diagram showing the structure of the data managed by the application execution management unit 45. Here, data as shown in FIG. 13 is registered the policy storage 33. The application execution management unit 45 monitors execution of applications, and when the application executing unit 31 starts execution of an application, the application execution management unit 45 checks whether the application is registered in the policy storage 33.

For example, when an application A is executed, the application execution management unit 45 detects the execution of the application A and confirms whether the application A is registered in the policy storage 33. For example, when a policy for the application A is registered in stored in the policy storage 33, the application name, application identification information, and network I/F information of the application A as shown in FIG. 16 are loaded into the application execution management unit 45.

Similarly, when an application C and an application E are executed with the application A being executed, data loaded into the application execution management unit 45 is as shown in FIG. 16. The application which is not registered in the policy storage 33 is registered as an application which should be inhibited to use each network I/F. That is, as shown in FIG. 16, policies concerning the applications currently being executed are loaded into the application execution management unit 45. In the example of FIG. 16, the applications A, C, and E are currently executed, and access permit/inhibit information concerning the applications A and C registered in the policy setting unit 34 is registered directly in the application execution management unit 45. Access permit/inhibit information concerning the applications B and D, which are not currently being executed, is not loaded into the application execution management unit 45. On the other hand, the application E, which is not found in the access permit/inhibit information registered in the policy setting unit 34 but being executed, is inhibited to use all of the network I/Fs.

Similarly to the first embodiment, one of the following three items or an arbitrary combination thereof is treated as the information for identifying each application: (a) the location where the application program file is stored (path name+file name); (b) the process name or process identification information given when executing the application; and (c) the hash value of the application program. In the example explained below, the information (c) is used.

If execution of the application C is terminated, the application execution management unit 45 eliminates the entry (policy) corresponding to the application C from the application execution management unit 45.

Note that the entry corresponding to the application C stored in the policy storage 33 is not eliminated. This is because the database stored in the policy storage 33 is used to manage policies regardless of whether each application is currently being executed, and only the policy setting unit 34 can add/eliminate the data of the policy storage 33.

Further, each application should be registered in the policy storage 33 before being executed, and processing steps for the registration are similar to the first embodiment. Accordingly, explanation therefor will be omitted.

Figure 17:
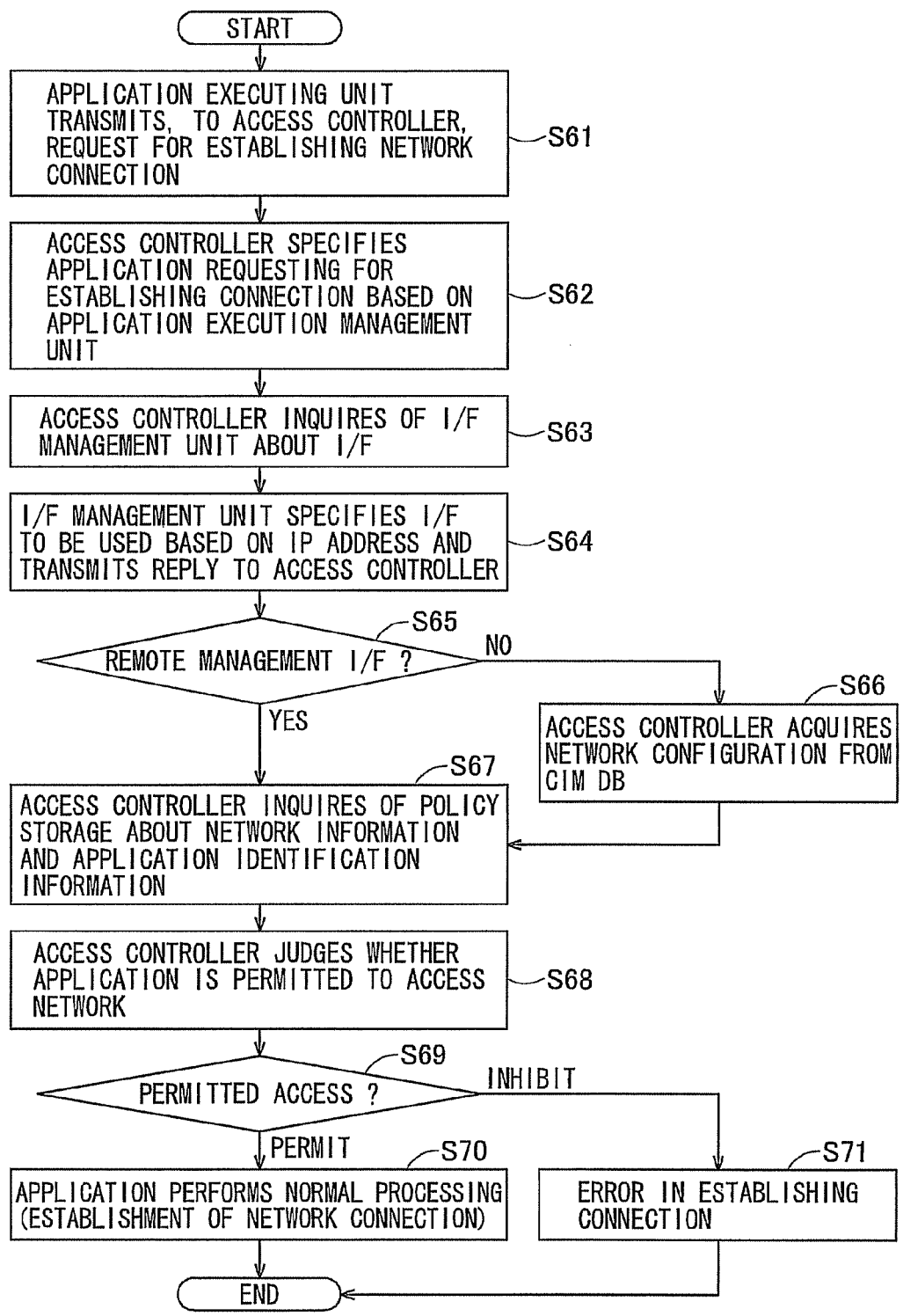
FIG. 17 is a diagram showing the processing steps of the second embodiment.

Next, processing steps performed in the access control phase by the EMS 10*b* according to the second embodiment will be explained. FIG. 17 is a diagram showing the processing steps performed by the application executing unit 31 and the access controller 32 in the access control phase conducted by the EMS 10*b* according to the second embodiment. First, an application is registered in the application execution management unit 45 when it is executed. Next, the application executing unit 31 transmits, to the access controller 32, a request for network establishing connection with a device on a network (Step S61). This request for establishing network connection includes at least the IP address or DNS domain name of the destination device. The access controller 32 receives a notification of the request for establishing connection, and specifies the application by inspecting which application has issued the request (Step S62). This inspection is performed using the information (shown in FIG. 16) managed by the application execution management unit 45. As another method, the application may be specified from a process list of the applications currently running. Further, if the name or identification information of the applications being executed is included in the request for establishing network connection, the information may be used to specify the application.

Next, the access controller 32 inquires of the I/F management unit 37 which interface corresponds to the IP address included in the request for establishing connection (Step S63), and specifies the power system network I/F or the remote management network I/F (Step S64).

Next, whether the specified I/F is the remote management I/F is judged (Step S65), and acquires network configuration from the CIM DB storage 43 if the specified I/F is the power system network I/F (Step S66). When the process of Step S66 is completed or when judgment at Step S65 shows that the specified I/F is the remote management I/F, the access controller 32 inquires of the policy storage 33 about network information and application identification information (Step S67).

Next, the access controller 32 inquires of the application execution management unit 45 whether the application is permitted to access the network I/F, based on the application identification information (Steps S68 and S69). If the access is permitted, the request for establishing connection is accepted and a predetermined processing is performed (Step S70), while if the access is inhibited, the request for establishing connection is resulted in an error (Step S71).

In this example, as shown in FIG. 16, the application execution management unit 45 manages access permit/inhibit information showing whether each application currently being executed is allowed to use each network and network I/F. As another example, the application execution management unit 45 may manage the application identification information corresponding to each application currently being executed, without managing the access permit/inhibit information showing whether each network and network I/F is allowed to be used. In this case, when the access controller 32 inquires of the application execution management unit 45 whether the application is permitted to access the network based on the application identification information, the application execution management unit 45 inspects whether the entry corresponding to the application is stored in the policy storage 33. If not stored, the access is inhibited, while if stored, the entry corresponding to the application is loaded from the policy storage 33 to judge whether the access to the network I/F used by the application is permitted.

In the first embodiment, the access controller 32 notifies whether an application is permitted to use a network I/F. In the second embodiment, whether the application is permitted/inhibited to use the network I/F is judged depending on whether a request for establishing connection is normally processed or resulted in an error. Accordingly, the application developer can develop an application in accordance with a normal procedure, which leads to an advantage that the cost of developing an application can be reduced.

Figure 18:
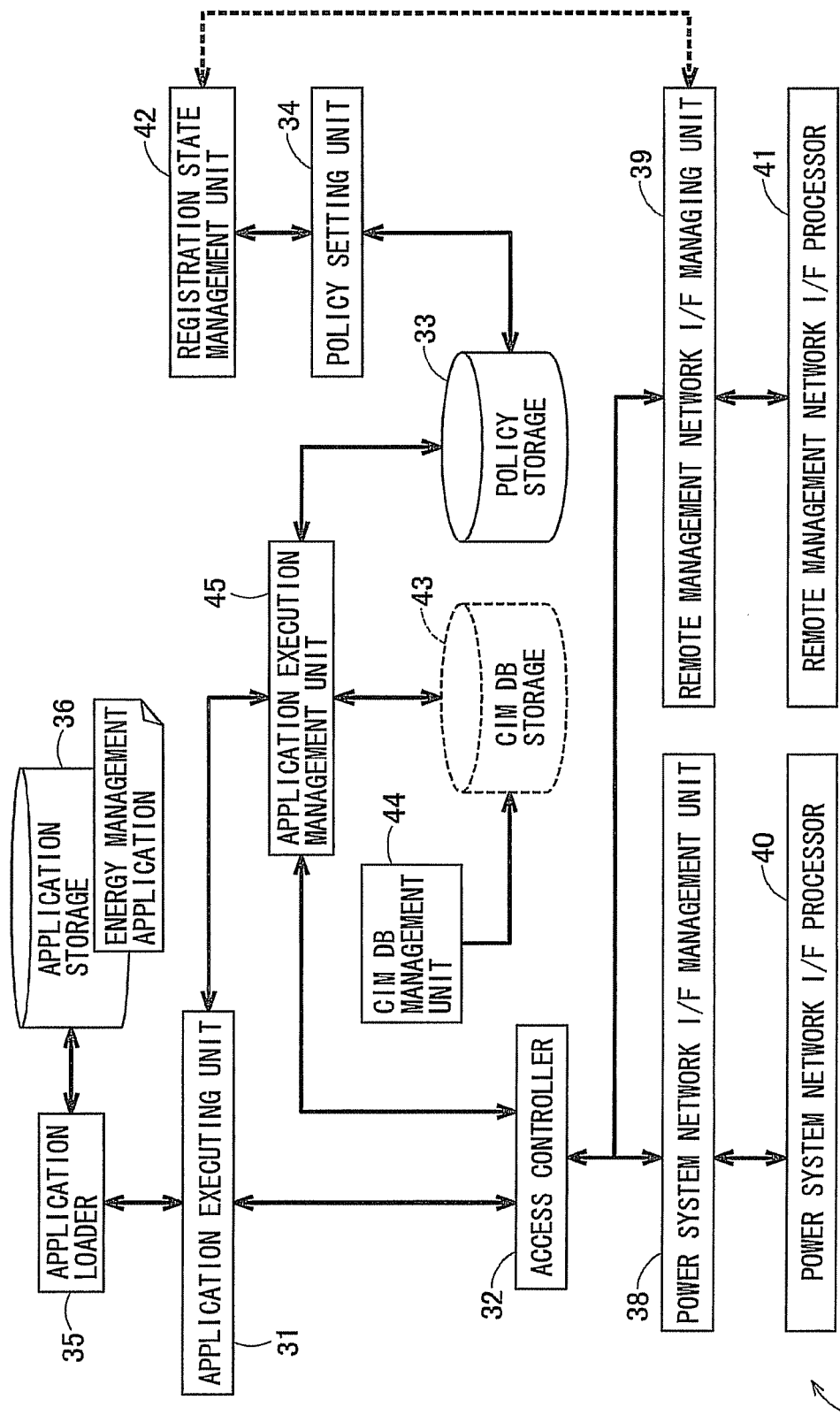
FIG. 18 is a block diagram showing a schematic structure of the second embodiment.

Hereinafter, explanation will be given on an example where processing performed by the EMS 10*b* is more simplified. FIG. 18 is a block diagram showing a schematic structure of an EMS 10*c* according to one modification example of the second embodiment. The EMS 10*c* shown in FIG. 18 is different from the block diagram of FIG. 12 in that the I/F management unit 37 is omitted and the application execution management unit 45 calls the policy storage 33 instead. The EMS 10c of FIG. 18 has the CIM DB storage 43 and the CIM DB management unit 44, but these components are not essential and thus may be omitted.

Figures 19A, 19B:
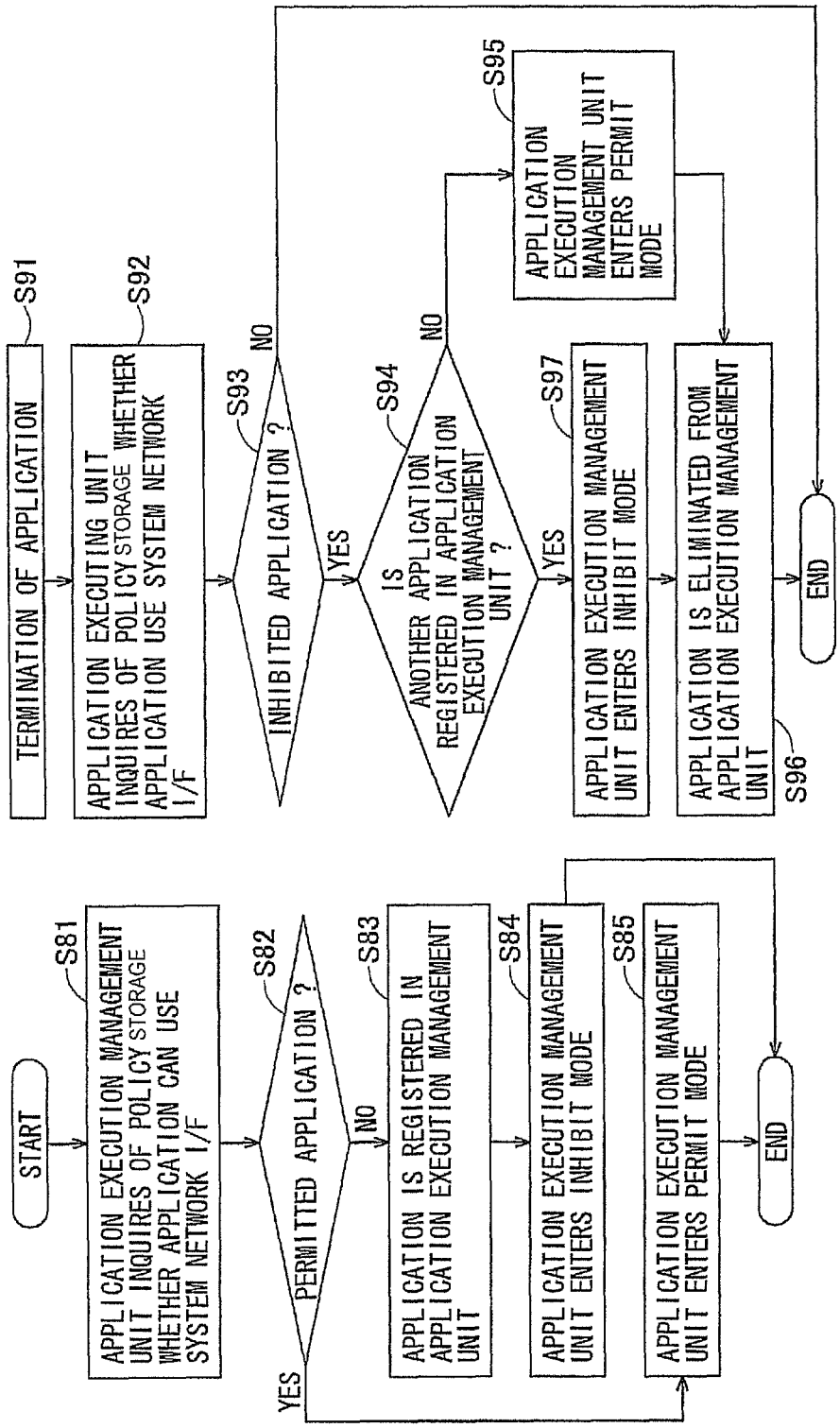
FIGS. 19A and 19B are diagrams showing an example of the processing steps in an access control phase.

FIG. 19 is a flow chart showing the processing steps in the access control phase conducted by the EMS 10c of FIG. 18. More concretely, FIG. 19(a) shows processing steps performed by the application executing unit 31 and the application execution management unit 45 when executing an application, while FIG. 19(b) shows processing steps performed by the application executing unit 31 and the application execution management unit 45 when terminating the application.

In FIG. 19(a), first, when an application is executed, the application execution management unit 45 inquires of the policy storage 33 whether the application is allowed to access the power system network I/F (Step S81). At this time, the application execution management unit 45 may further inquire of the CIM DB storage 43 whether the application is allowed to access the network A or B in the power system network (Step S82). If the application is permitted to access the power system network I/F, the application execution management unit 45 enters a permit mode (Step S83).

On the other hand, if the application is inhibited to access the power system network I/F, the application is registered in the application execution management unit 45 (Step S84), and the application execution management unit 45 enters an inhibit mode (Step S85). That is, an application which is currently being executed and inhibited to use the power system network I/F is registered in the list of the application execution management unit 45. In the inhibit mode, even when an application which is allowed to access the power system network I/F is executed, the inhibit mode does not shift to the permit mode and remains the same (not shown).

Figures 20, 21:
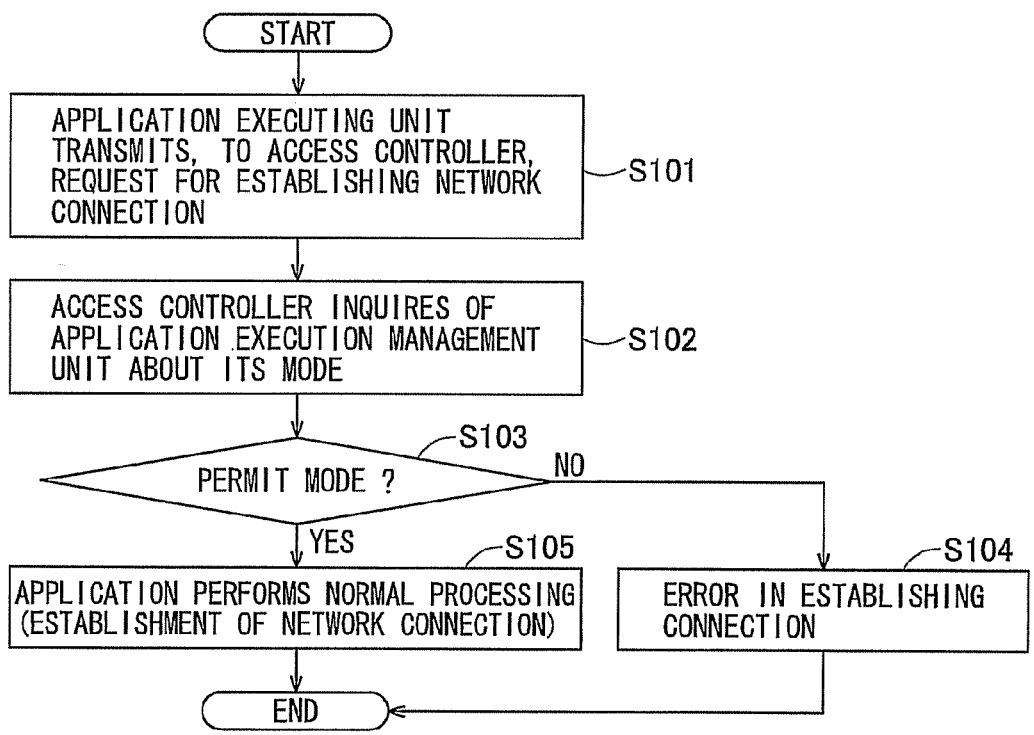
FIG. 20 is a diagram showing a list example of the applications registered in the application execution management unit.
FIG. 21 is a diagram showing an example of the processing steps when a request for establishing connection is notified.

FIG. 20 is a diagram showing a list example of the applications registered in the application execution management unit 45. As shown in FIG. 20, although the applications A and C permitted to access the power system network I/F are actually executed, those applications are not registered in the application execution management unit 45, and the application E inhibited to access the power system network I/F is registered instead.

When an application is terminated, as shown in FIG. 19(b), the application executing unit inquires of the policy storage 33 whether the application is allowed to access the power system network I/F (Steps S91 and S92). If the access from the application is permitted, the process flow proceeds to the end while retaining the state.

On the other hand, if the access from the application is inhibited, whether another application is registered in the application execution management unit 45 is checked (Step S93). If another application is registered, the application execution management unit 45 is kept in the inhibit mode (Step S94), while if another application is not registered, the application execution management unit 45 is set to the permit mode (Step S95). Then, the information about the terminated application is eliminated from the application execution management unit 45, and the process flow proceeds to the end (Step S96).

Here, if the application execution management unit 45 is set to the inhibit mode, all of the applications which are not registered in the policy storage 33 and the application execution management unit 45 and are being executed are inhibited to the power system network I/F. To the contrary, if the application execution management unit 45 is set to the permit mode, all of the applications which are not registered in the policy storage 33 and the application execution management unit 45 and are being executed are permitted access to the power system network I/F.

It is desirable that the application execution management unit 45 exclusively manages the registration and elimination of applications in order not that registration and elimination are executed simultaneously.

FIG. 21 is a flow chart showing the processing steps when the access controller 32 is notified that the application executing unit 31 has issued a request for establishing connection with a device on a network. The access controller 32 receives the notification of the request for establishing connection (Step S101), and inquires of the application execution management unit 45 about its mode (Steps S102 and S103). If the application execution management unit 45 is in the inhibit mode, the request for establishing connection is resulted in an error (Step S104). If the application execution management unit 45 is in the permit mode, a predetermined process for establishing connection is performed (Step S105).

Here, when the application execution management unit 45 is in the inhibit mode, one or more applications inhibited to access the power system network I/F are executed, and thus every application is inhibited to access the power system network I/F. Accordingly, the access controller 32 can omit a process for checking the sender of each request for establishing connection, which makes it possible not only to simplify the device configuration but also to control access without deteriorating execution speed.

As explained above, according to the second embodiment, even when the developer developing an application for establishing connection with a device on a network does not describe any special process, the permit mode or the inhibit mode are set through the process of FIG. 19, which makes it possible to control the access to the network from each application simply.

At least a part of the energy management system and power management system explained in the above embodiments may be implemented by hardware or software. In the case of software, a program realizing at least a partial function of the energy management system and power management system may be stored in a recording medium such as a flexible disc, CD-ROM, etc. to be read and executed by a computer. The recording medium is not limited to a removable medium such as a magnetic disk, optical disk, etc., and may be a fixed-type recording medium such as a hard disk device, a semiconductor memory, etc.

Further, a program realizing at least a partial function of the energy management system and power management system can be distributed through a communication line (including radio communication) such as the Internet 3. Furthermore, this program may be encrypted, modulated, and compressed to be distributed through a wired line or a radio link such as the Internet 3 or through a recording medium storing it therein.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. An energy management system comprising:
   an application storage to store at least one or more application including an application for power management;
   an application executor to execute an application stored in the application storage;
   a plurality of network interfaces arranged corresponding to a plurality of networks, respectively;
   a policy storage to store identification information and access permit or inhibit information showing whether the application is permitted to access each of the network interfaces;
   a registration state manager to determine whether the policy storage is permitted to register identification information of the application and access permit or inhibit information;
   a policy setter to set whether each application should be permitted to access each of the network interfaces when the registration state manager permits the registration;
   an interface manager to manage a correspondence relationship between a network address and each of the network interfaces, and to specify a network interface used by the application executed by the application executor; and
   a controller to judge whether the application executed by the application executor is permitted to access the network interface to be used thereby, based on the access permit or inhibit information stored in the policy storage.

2. The energy management system of claim 1, wherein the controller permits access to a network interface when access permit or inhibit information showing access permission thereto is stored in the policy storage, and inhibits access to the network interface when such access permit or inhibit information is not stored in the policy storage.

3. The energy management system of claim 1,
   wherein the application executor notifies the access controller about an IP address used by an execution target application and identification information for the application,
   the interface manager specifies a network interface to be used based on the IP address used by the execution target application, and notifies the controller about the network interface, and
   the controller inquires of the interface manager about the network interface corresponding to the IP address used by the execution target application, and inquires of the policy storage about whether access to the network interface notified by the interface manager is permitted.

4. The energy management system of claim 1, wherein the network interfaces includes a private network interface and a public network interface.

5. The energy management system of claim 4, wherein the policy setter permits an application requesting access to a device connected to a private network to access the private network interface, but inhibits the application from using the public network interface.

6. The energy management system of claim 4, wherein the policy setter permits an application requesting access to a device connected to a public network to access the public network interface, but inhibits the application from accessing the private network interface.

7. The energy management system of claim 1, further comprising:
   a network configuration manager to detect a change in configuration of a private network; and
   a network configuration information storage configured to store configuration information about the private network, and to update the stored configuration information regarding the private network when the network configuration manager detects a change in configuration of the private network,
   wherein when the network interface used by the application executed by the application executor is a private network interface, the controller reads latest configuration information from the network configuration information storage, and detects whether access to each network corresponding to the read configuration information is permitted based on the policy storage.

8. The energy management system of claim 7, further comprising:
   an application execution manager manage the application currently being executed by the application executor,
   wherein the application execution manager creates and manages a management table including identification information for each application, access permit or inhibit information showing whether the application is permitted to access each private network, and access permit or inhibit information showing whether the application is permitted to access a public network interface for a public network, based on the latest configuration information read from the network configuration information storage and the access permit or inhibit information stored in the policy storage, and
   the controller judges whether access to the network interface used by the application executed by the application executor is permitted based on the access permit or inhibit information managed by the application execution manager.

9. The energy management system of claim 8, wherein when the application executor terminates execution of the application, the application execution management unit eliminates the identification information and access permit or inhibit information for the application from the management table, and
   the policy storage stores the identification information and access permit or inhibit information for each application regardless of whether each application is being executed.

10. An energy management system comprising:
    an application storage configured to store at least one or more application including an application for power management;
    an application executor to execute an application stored in the application storage;
    a plurality of network interfaces arranged corresponding to a plurality of networks including a public network and a private network, respectively;
    a policy setter to set whether each application should be permitted to access each of the network interfaces;
    a policy storage to store identification information, and access permit or inhibit information showing whether the application is permitted to access each of the network interfaces;
    a controller to judge whether the application executed by the application executor is permitted to access the network interface to be used thereby, based on the access permit or inhibit information stored in the policy storage; and
    an application execution manager to manage an application currently being executed by the application executor, by creating a management table registering identification information for the application and access permit or inhibit information showing whether the application is permitted to access the network interfaces, wherein the application execution manager has:
a start mode setter to judge whether the application executed by the application executor is permitted to access the private network based on the access permit or inhibit information stored in the policy storage, in order to set the access permit or inhibit information for the application in the management table to a permit mode if permitted or to an inhibit mode if not permitted;
a termination mode setter to judge, when terminating the application, whether the application is inhibited from accessing the private network based on the access permit or inhibit information stored in the policy storage, in order to promptly terminate the application if not inhibited or to detect whether another application is registered in the management table if inhibited and set every application being executed to the inhibit mode for inhibiting access to the private network if registered or to the permit mode for permitting access to the private network if not registered; and
a registration eliminator to eliminate the registration information regarding the terminated application from the management table after setting the termination mode by the termination mode setter.

11. The energy management system of claim 10, wherein the controller permits access to a network interface when access permit or inhibit information showing access permission thereto is stored in the policy storage, and inhibits access to the network interface when such access permit or inhibit information is not stored in the policy storage.

12. A power management system, comprising:
a power system management device;
a customer's power management device to communicate with the power system management device through a public network;
a power-related information providing server to communicate with the power system management device through a public network; and
a maintenance management device to communicate with the power system management device through the public network,
wherein the power system management device comprises:
an energy management system;
a power meter management device to communicate with the energy management system through a power system network;
a relay to relay communication between the power meter management device and the customer's power management device; and
a remote terminal to communicate with the energy management system through the power system network, and
the customer's power management device comprises:
a smart meter to communicate with the relay through the public network; and
a home server to communicate with the power meter management device through the public network, and
the energy management system comprises:
an application storage to store at least one or more application including an application for power management;
an application executor to execute an application stored in the application storage;
a plurality of network interfaces arranged corresponding to a plurality of networks including the public network and the power system network, respectively;
a policy storage to store identification information and access permit or inhibit information showing whether the application is permitted to access each of the network interfaces;
a registration state manager to determine whether the policy storage is permitted to register identification information of the application and access permit or inhibit information;
a policy setter to set whether each application should be permitted to access each of the network interfaces when the registration state manager permits the registration;
an interface manager to manage a correspondence relationship between a network address and each of the network interfaces, and to specify a network interface used by the application executed by the application executor; and
a controller to judge whether the application executed by the application executor is permitted to access the network interface to be used thereby, based on the access permit or inhibit information stored in the policy storage.

13. The power management system of claim 12, wherein the controller permits access to a network interface when access permit or inhibit information showing access permission thereto is stored in the policy storage, and inhibits access to the network interface when such access permit or inhibit information is not stored in the policy storage.

14. The power management system of claim 12, wherein the application executor notifies the controller about an IP address used by an execution target application and identification information for the application,
the interface manager specifies a network interface to be used based on the IP address used by the execution target application, and notifies the controller about the network interface, and
the controller inquires of the interface manager about the network interface corresponding to the IP address used by the execution target application, and inquires of the policy storage about whether access to the network interface notified by the interface manager is permitted.

15. The power management system of claim 12, wherein the network interfaces includes a private network interface and a public network interface.

16. The power management system of claim 15, wherein the policy setter permits an application requesting access to a device connected to a private network to access the private network interface, but inhibits the application from using the public network interface.

17. The power management system of claim 15, wherein the policy setter permits an application requesting access to a device connected to a public network to access the public network interface, but inhibits the application from accessing the private network interface.

18. The power management system of claim 12, further comprising:
a network configuration manager configured to detect a change in configuration of a private network; and
a network configuration information storage store configuration information regarding the private network, and to update the stored configuration information regarding the private network when the network configuration manager detects a change in configuration of the private network,
wherein when the network interface used by the application executed by the application executor is a private network interface, the controller reads latest configuration information from the network configuration information storage, and detects whether access to each network corresponding to the read configuration information is permitted based on the policy storage.

19. The power management system of claim 18, further comprising:

an application execution manager configured to manage the application currently being executed by the application executor, wherein the application execution manager creates and manage a management table including identification information for each application, access permit or inhibit information showing whether the application is permitted to access each private network, and access permit or inhibit information showing whether the application is permitted to access a public network interface for a public network, based on the latest configuration information read from the network configuration information storage and the access permit or inhibit information stored in the policy storage, and the controller judges whether access to the network interface used by the application executed by the application executor is permitted based on the access permit or inhibit information managed by the application execution management unit.

20. The power management system of claim 19, wherein when the application executor terminates execution of the application, the application execution manager eliminates the identification information and access permit or inhibit information for the application from the management table, and the policy storage stores the identification information and access permit or inhibit information for each application regardless of whether each application is being executed.

* * * * *